United States Patent
Bieber et al.

(10) Patent No.: US 11,309,798 B2
(45) Date of Patent: Apr. 19, 2022

(54) SINGLE INDUCTOR MULTIPLE OUTPUT (SIMO) CONVERTER AND CONTROL THEREOF

(71) Applicant: Solaredge Technologies Ltd., Herzeliya (IL)

(72) Inventors: Ofir Bieber, Ra'anana (IL); Yaniv Hachamo, Shoham (IL); Meir Gazit, Ashkelon (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/021,343

(22) Filed: Sep. 15, 2020

(65) Prior Publication Data

US 2021/0175814 A1 Jun. 10, 2021

Related U.S. Application Data

(63) Continuation of application No. 16/039,954, filed on Jul. 19, 2018, now Pat. No. 10,811,982.

(60) Provisional application No. 62/535,293, filed on Jul. 21, 2017.

(51) Int. Cl.
*H02M 3/158* (2006.01)
*H02M 3/335* (2006.01)
*H02M 1/00* (2006.01)

(52) U.S. Cl.
CPC ....... *H02M 3/158* (2013.01); *H02M 3/33561* (2013.01); *H02M 1/009* (2021.05)

(58) Field of Classification Search
CPC ... H02M 3/158; H02M 3/33561; H02M 1/009
See application file for complete search history.

(56) References Cited

U.S. PATENT DOCUMENTS

| | | |
|---|---|---|
| 2008/0055946 A1* | 3/2008 | Lesso ............... H02M 3/33561 363/63 |
| 2010/0097045 A1 | 4/2010 | Chen |
| 2014/0246908 A1 | 9/2014 | Chew et al. |
| 2015/0188434 A1 | 7/2015 | Ouyang |
| 2016/0380455 A1 | 12/2016 | Greening et al. |
| 2017/0093292 A1 | 3/2017 | Chan et al. |

(Continued)

FOREIGN PATENT DOCUMENTS

EP 3002863 A1 4/2016

OTHER PUBLICATIONS

Bandyopadhyay, et al. "Platform Architecture for Solar, Thermal, and Vibration Energy Combining with MPPT and Single Inductor", IEEE Journal of Solid-State Circuits, IEEE Service Center, Sep. 1, 2012, pp. 2199-2215, XP011457914.

*Primary Examiner* — Jue Zhang
(74) *Attorney, Agent, or Firm* — Banner & Witcoff, Ltd.

(57) ABSTRACT

A power converter includes an input circuit, an output circuit and a controller. The output circuit may comprise a plurality of output terminals configured to be connected to a plurality of loads. The input circuit may comprise a plurality of input terminals configured to be connected to one or more power sources. An inductive element may be coupled between the input circuit and the output circuit. The output circuit may feature one or more voltage compensation circuits connected between two output terminals, the voltage compensation circuits activated to compensate an output voltage at one of the two output terminals.

20 Claims, 15 Drawing Sheets

(56) References Cited

U.S. PATENT DOCUMENTS

2017/0141603 A1   5/2017   King et al.
2017/0187187 A1   6/2017   Amin et al.

* cited by examiner

SINGLE INDUCTOR MULTIPLE OUTPUT (SIMO) CONVERTER AND CONTROL THEREOF

This application is a continuation of U.S. application Ser. No. 16/039,954, filed Jul. 19, 2018 which claims priority to U.S. Patent Application No. 62/535,293 filed on Jul. 21, 2017 and entitled "SINGLE INDUCTOR MULTIPLE OUTPUT (SIMO) CONVERTER AND CONTROL THEREOF." The disclosure of these applications is incorporated by reference herein in their entireties and made part thereof.

BACKGROUND

Single inductor Multiple Output (SIMO) converters may be used to provide multiple output voltage levels converted from an input voltage source via a single inductor. The single inductor may be charged with current during a first period of time of a switching cycle, and may discharge current to maintain the multiple output voltage levels during a second period of time of the switching cycle. As each output may be connected to a load drawing variable current, it may prove challenging to maintain the proper output voltage levels at each of the plurality of outputs. Many existing solutions utilize complex control voltage loops which may result in slow responses to load variations or control methods which may incur substantial losses. There is a need for and it would be advantageous to have an efficient SIMO converter having fast, efficient control methods for output load variation control.

SUMMARY

The following summary may be a short summary of some of the inventive concepts for illustrative purposes only, and may be not intended to limit or constrain the inventions and examples in the detailed description. One skilled in the art will recognize other novel combinations and features from the detailed description.

Embodiments disclosed herein may include arrangements of a single-inductor-multiple-output (SIMO) converter and methods for operation thereof.

According to some aspects of the disclosure, a priority-based control method regulates the output voltage at each output terminal of the SIMO converter. The converter may have a voltage control loop at each output terminal, and the voltage control loops may be implemented using a similar method, or using different methods (e.g. proportional control, proportional-integral control, peak current mode, etc.). For example, according to some aspects, each output terminal may have a proportional-integral-derivative (MD) control loop regulating the output voltage. According to some aspects, one output terminal may have a proportional-integral-derivative (PID) control loop regulating the output voltage, with the other output terminals voltage controlled using hysteretic control loops. According to some aspects, a single PID control loop may regulate, in turn, each of the output voltage terminals.

According to features of certain embodiments, one or more voltage compensation circuits may connect one or more output terminals. The voltage compensation circuits may be utilized to transfer charge from a first output to a second output, to compensate the second output at the expense of the first output, resulting in triggering a response by the control loop regulating the first output, which may be more effective than a response by the control loop regulating the second output.

According to features of certain embodiments, the one or more voltage compensation circuits may be variously implemented. For example, a voltage compensation circuit may comprise a switch moved to the ON state, and the switch may be utilized to transfer charge from a first output to a second output, to compensate the second output at the expense of the first output. According to some features, the switch may have a controllable drain-source voltage drop controlled to set a voltage at a second output terminal based on a voltage at a first output terminal.

According to features of certain embodiments, the one or more voltage compensation circuits may be variously implemented. For example, a voltage compensation circuit may be implemented as an analog device circuit, e.g. low-dropout regulator, buck converter, etc. Another possible implementation of one or more voltage compensation circuits may be a digital controlled circuit. According to features of certain embodiments, the one or more voltage compensation circuits may be synchronously controlled with other circuit components while in other embodiments the one or more voltage compensation circuits may have may be controlled asynchronously. Moreover, according to features of certain embodiments, the one or more voltage compensation circuits may be controlled with other circuit components while in other embodiments the one or more voltage compensation circuits may have may have an independent control system.

Features disclosed herein may include an input circuit, an output circuit and a controller packaged as a single integrated circuit. The integrated circuit may be provided as a generic power regulation circuit, the chip providing connections for adding discrete components (e.g. inductive elements such as inductors and transformer windings, capacitors, additional switches, etc.) according to application-specific design choices.

In some illustrative aspects of the disclosure herein, one or more inductive elements (e.g. inductors, transformers, coupled inductors, etc.) may have a different windings ratio (the number of turns of wire on a first winding compared to a second winding. e.g. 1:1, 1:4, 3:1, etc.) and may contain more than one set of primary windings and/or more than one set of secondary windings, wound on a common core.

Features disclosed herein may further include a SIMO converter providing a plurality of input connections, each input connection configured to be connectable to an input power source. The SIMO converter may provide switches to regulate a parameter of the input power sources (e.g. voltage, current, power, temperature, etc.). For example, the SIMO converter may be connected to a plurality of photovoltaic generators, each photovoltaic generator connected to a corresponding input terminal, and the SIMO converter may control the photovoltaic generators according to a maximum-power-point-tracking (MITT) for increasing the power yield of the photovoltaic generators.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

DETAILED DESCRIPTION OF THE DRAWINGS

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1A:
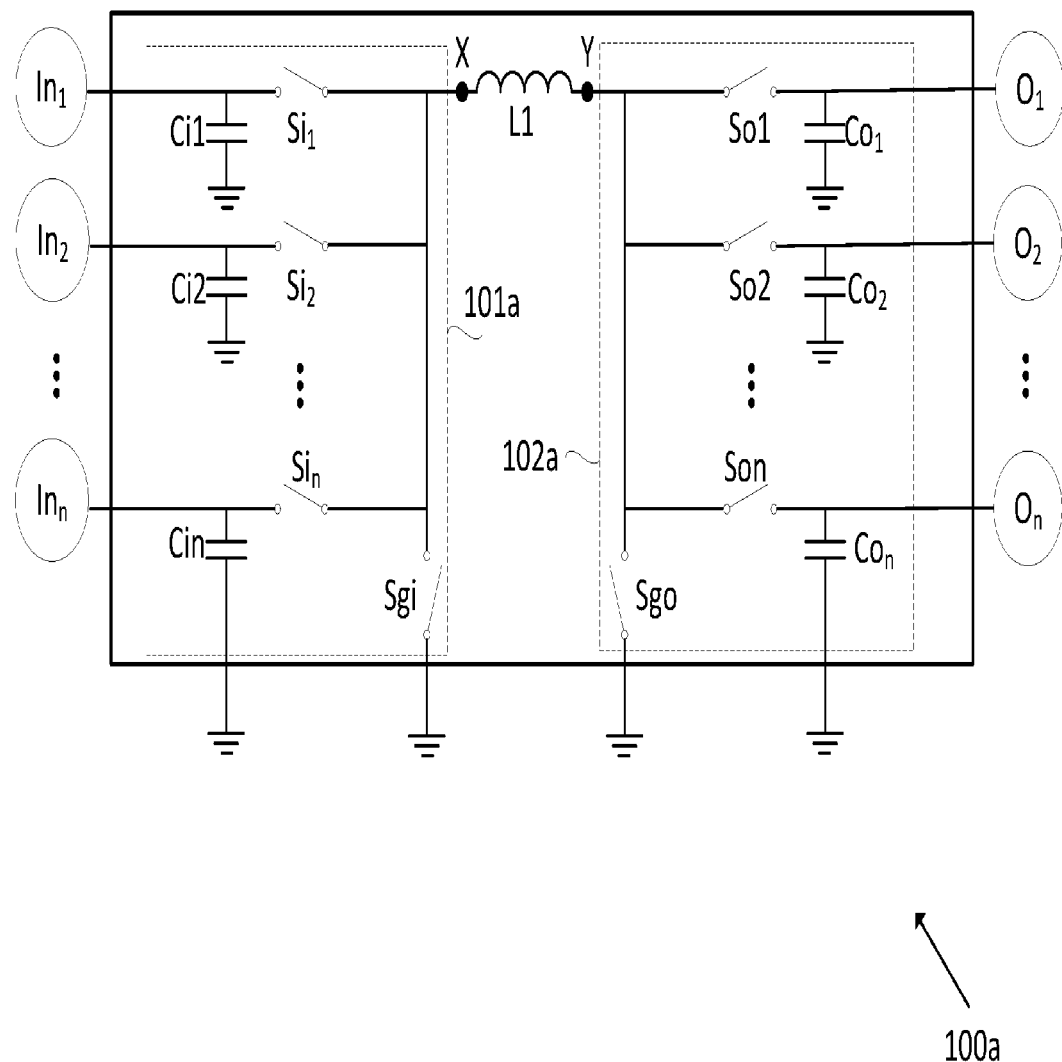
FIG. 1A is part schematic, part diagram of a SIMO converter according to one or more illustrative embodiments.

Reference is now made to FIG. 1A, which shows a single-inductor-multiple-output (SIMO) converter according to one or more aspects of the present disclosure. Converter 100a may include input circuit 101a and output circuit 102a. Input circuit 101a may be configured to be connected to one or more power sources $In_1$, $In_2$ ... $In_n$. Power sources $In_1$, $In_2$ ... $In_n$ may be one or more photovoltaic (PV) generator(s) (e.g. a PV cell, substring of PV cell(s), PV panel(s), string(s) of PV panels), wind turbine(s), hydro-turbine(s), fuel cell(s), battery(ies), and/or supercapacitor(s). Input circuit 101a may have one or more input terminals, with an input capacitor (e.g. Ci1, Ci2 ... Cin) coupled between each input terminal and a reference terminal (e.g., a ground terminal. According to some aspects, the reference terminal might not be a ground terminal). Input circuit 101a may further comprise a switch (e.g. $Si_1$, $Si_2$ ... $Si_n$) coupled between each input terminal and a first central node X. An additional switch Sgi may be coupled between first central node X and ground. Switches Si1 ... S1n and switch Sgi may be switched to provide buck-converter functionality for converting input voltages available at power sources $In_1$, $In_2$ ... $In_n$ to a common voltage at first central node X.

Switches disclosed herein (e.g., switches $Si_1$ ... $Si_n$, switches Sgi and Sgo, and switches $So_1$ ... $So_n$ illustrated in FIG. 1A, but also switches disclosed in other figures with regard to other aspects of the disclosure) may be implemented using, for example, Metal Oxide Semiconductor Field Effect Transistors (MOSFETs), Insulated Gate Bipolar Transistor (IGBT), Junction Gate Field Effect Transistors (JFETs), or other suitable switch types. Switches disclosed herein may be unidirectional or bidirectional switches, according to system arrangement. For example, where power source $In_1$ is a photovoltaic generator, switch $Si_1$ may be a unidirectional switch (e.g. a MOSFET with a body diode cathode coupled to capacitor Ci1 and the body diode anode coupled to node X) configured to allow current to flow from node X to capacitor Ci1, but to block current from flowing in the reverse directional. Where power source $In^2$ is a battery, switch Sit may be a bidirectional switch (e.g., two MOSFETs connected back-to-back) configured to block current from flowing from capacitor Ci2 to node X, or in the reverse directional.

Input capacitors Ci1 ... Cin are shown sharing a common reference (e.g., ground) terminal. The connecting of each capacitor to the common reference terminal may be via solder, inlaid at a Printed Circuit Board (PCB) level, fabricated at the silicon level of an integrated circuit, or may be carried out using jumpers after manufacturing.

Output circuit 102a may be configured to be connected to one or loads connected at outputs $O_1$, $O_2$ ... $O_n$. Output circuit 102a may have one or more output terminals, with a storage device, for example an output capacitor (e.g. $Co_1$, $Co_2$ ... $Co_n$) coupled between each output terminal and a reference (e.g., ground) terminal. Output circuit 102a may further comprise a switch (e.g. $So_1$, $So_2$ ... $So_n$) coupled between each input terminal and a second central node Y. An additional switch Sgo may be coupled between second central node Y and ground. Switches $So_1$ ... $So_n$ and switch Sgo may be switched to provide boost converter functionality for converting the voltage at second central node Y to a plurality of output voltages available at outputs $O_1$ ... $O_n$. According to some aspects, Sgo might not be featured where boost functionality is not required. According to some aspects, Sgo may be a standard part of output circuit 102a, and may be kept OFF where boosting is not utilized. Providing more than one output voltage may be useful for powering multiple loads that may require various operational input voltage levels. For example, converter 100a may serve as an auxiliary power converter configured to provide various voltage levels (e.g. 20V, 15V, 12V, 5V, 3V, 2V etc.) to various devices included in a main power converter (e.g. gate drivers, communication devices, sensors(s), etc.).

Inductor L1 may be coupled between first central node X and second central node Y. Inductor L1 may be combined with input circuit 101a and output circuit 102a to provide combined Buck+Boost functionality between power sources $In_1$ ... $In_n$ and outputs $O_1$ ... $O_n$.

Switches $So_1 \ldots So_n$ may be switched in a staggered manner to regulate the output voltages available at outputs $O_1 \ldots O_n$. When switch $So_1$ is ON, switches $So_2 \ldots SO_n$ may be OFF, and current may flow from inductor L and charge capacitor $Co_1$. In a similar manner, each one of output switches $So_1 \ldots So_n$ may be ON for a respective period of time during which the other output switches are OFF, and during the respective period of time the corresponding output capacitor may be charged. The relative period of time for charging each output capacitor may be regulated according to the corresponding desired output voltage and according to the current drawn by a corresponding load connected at the output. When Sgo is ON, output switches $So_1 \ldots So_n$ may be OFF and inductor L may be charged with current from input circuit 101a.

Figure 1B:
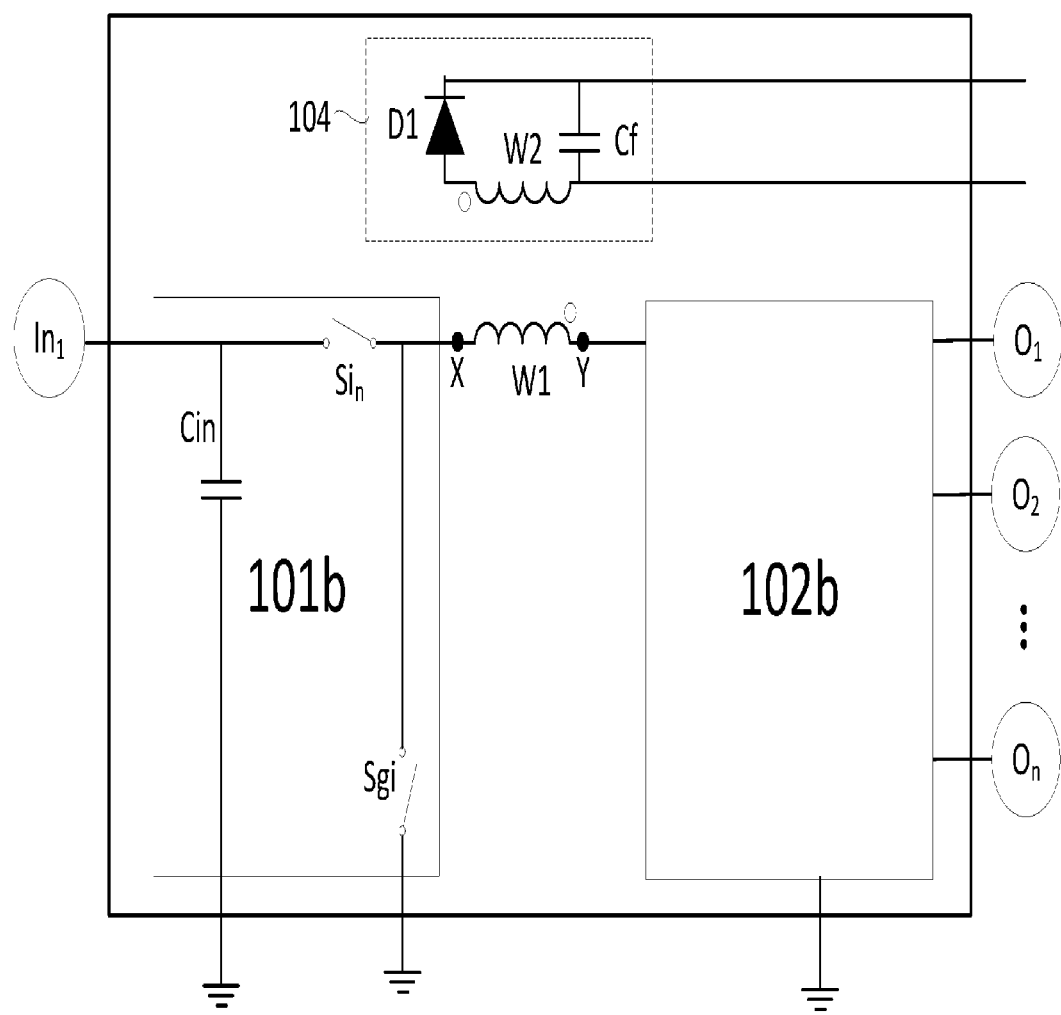
FIG. 1B is part schematic, part block diagram of a SIMO converter according to one or more illustrative embodiments.

Reference is now made to FIG. 1B, which shows a SIMO converter according to illustrative aspects of the disclosure herein. Converter 100b may comprise input circuit 101b and output circuit 102b. Input circuit 101b may be similar to or the same as input circuit 101a of FIG. 1A. In the example shown in FIG. 1B, only one input is connected to converter 100b and therefore input circuit 101b comprises circuitry for one input only. Output circuit 102b may be the same as output circuit 102a of FIG. 1. According to some aspects (not explicitly shown), output circuit 102b may feature a single output. Inductor L of FIG. 1A may be replaced or augmented by first winding W1 connected between terminals X and Y. Floating output circuit 104b may comprise second winding W2 that may be magnetically coupled to first winding W1 (e.g., by first winding W1 and second winding W2 being wound around a common magnetic core), and may further comprise diode D1 coupled in series to second winding W2 and capacitor Cf. Capacitor Cf may be charged by current induced in second winding W2, with diode D1 rectifying the current through second winding W2 to prevent discharge of capacitor Cf. Capacitor Cf may provide a floating output which might not be referenced to the grounding terminal of converter 100b. According to some features, diode D1 may be replaced by a full-bridge diode circuit providing a rectified charging current to capacitor Cf. According to some features, diode D1 may be replaced by a single switch (e.g. a transistor such as a MOSFET, IGBT etc.) or full-bridge transistor circuit enabling bidirectional conduction and/or providing reduced switching and conduction losses.

Providing one or more floating output terminals (e.g., by converter 100b having one or more floating output circuits 104b) may provide certain advantages. For example, floating output circuit 104b may be used to drive a transistor which might not have a terminal connected to ground. For example, a high-side buck converter switch might be turned ON by a gate-to-source voltage of about 12V, with the source terminal not connected to ground. Connecting the source and gate terminals across capacitor Cf may enable easy and efficient switching of the high-side buck converter switch. The floating output terminals may be provided to a circuit included within converter 100b, or may be provided to external components (e.g. a load similar to or the same as loads connected at outputs $O_1 \ldots O_n$).

Figure 1C:
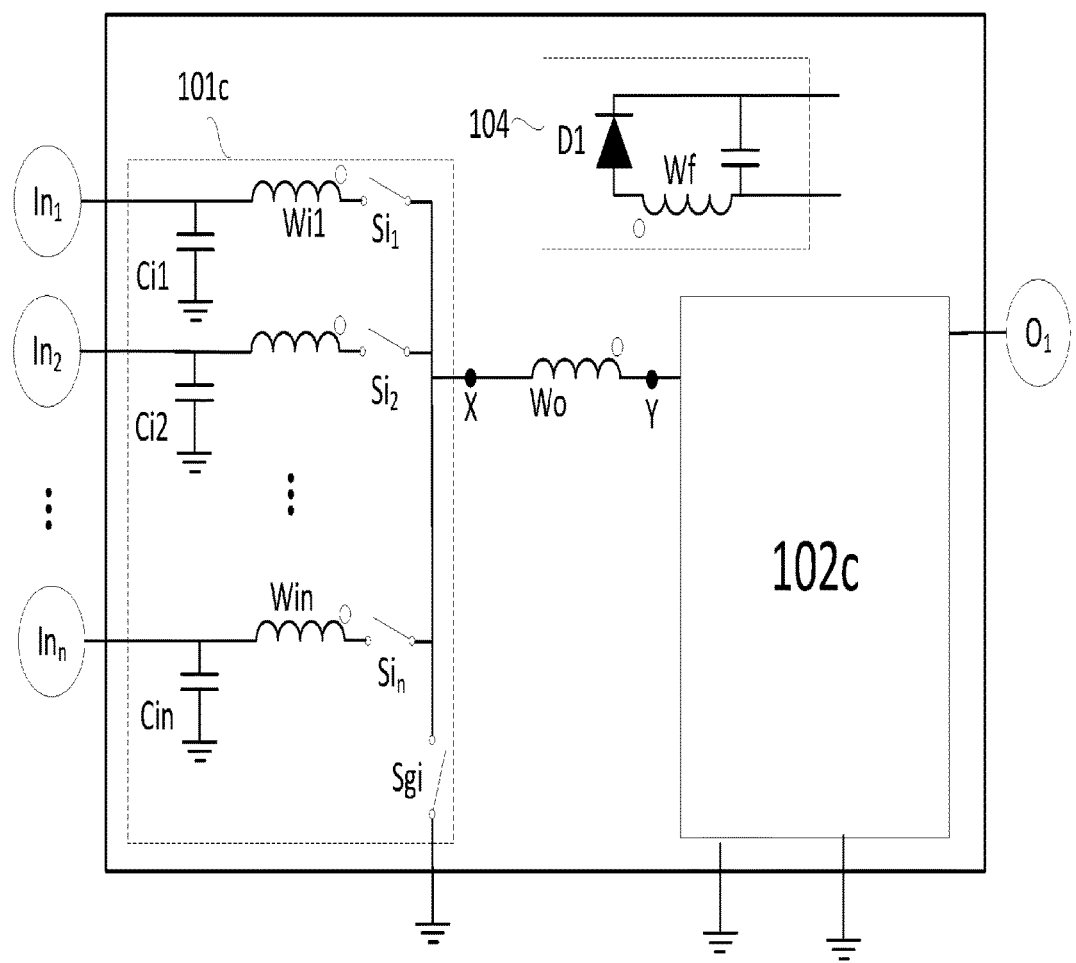
FIG. 1C is part schematic, part block diagram of a SIMO converter according to one or more illustrative embodiments.

Reference is now made to FIG. 1C, which shows a converter according to illustrative aspects of the disclosure herein. Converter 100c may comprise input circuit 101c and output circuit 102c. Output circuit 102c is shown having a single connected load; according to aspects of the disclosure herein additional loads may be added similar to the outputs of output circuits 102a and 102b. Input circuit 101c may be configured to be connected to one or more power sources $In_1, In_2 \ldots In_n$. Input circuit 101c may have one or more input terminals, with an input capacitor (e.g. Ci1, Ci2 ... Cin) coupled between each input terminal and a reference (e.g., ground) terminal. Input circuit 101c may feature one or more legs, coupled at a first end to an input capacitor and at a second leg to node X, and each leg may have an input switch (e.g. $Si_1, Si_2 \ldots Si_n$) coupled in series to an input winding (e.g. $Wi_1, Wi_2 \ldots Wi_n$). Input windings $Wi_1 \ldots Wi_n$ may be mutually magnetically coupled by input windings $Wi_1 \ldots Wi_n$ being wound around a magnetic core. Output winding Wo may be wound around the magnetic core and may be magnetically coupled to the input windings via the magnetic core.

Input switches $Si_1 \ldots Si_n$ may be operated to alternate charging windings $Wi_1 \ldots Wi_n$ with current drawn from connected input power sources $In_1 \ldots In_n$ and discharge input windings $Wi_1 \ldots Wi_n$ to output winding Wo via the common magnetic core. The duty cycle of each input switch may be selected according the input voltage (e.g., according to maximum power point tracking (MPPT) considerations), according to the voltage across output winding Wo and according to the winding ratio between each input winding and output winding Wo. For example, if the voltage across output winding Wo is 40V, the winding ratio between input winding $Wi_1$ and output winding Wo is 1:2 and the input voltage is 10V, the duty cycle of input switch $Si_1$ may be about 50%.

Switch Sgi may be coupled between node X and a reference node (e.g., ground). Switch Sgi may be ON when switches $Si_1 \ldots Si_n$ are OFF, to enable discharging of current from winding Wo to output circuit 102c.

Output circuit 102c may be similar to or the same as output circuits 102b and 102a. Output circuit 102c is shown having a single connected load; in other arrangements, additional loads may be connected (as shown with regard to output circuits 102a and 102b).

Floating output circuit 104c may be coupled via winding Wf to the magnetic core common to input windings $Wi_1 \ldots Wi_n$ and output winding Wo, and may be structurally and functionally similar to winding W2 as described with regard to FIG. 1B.

Figure 1D:
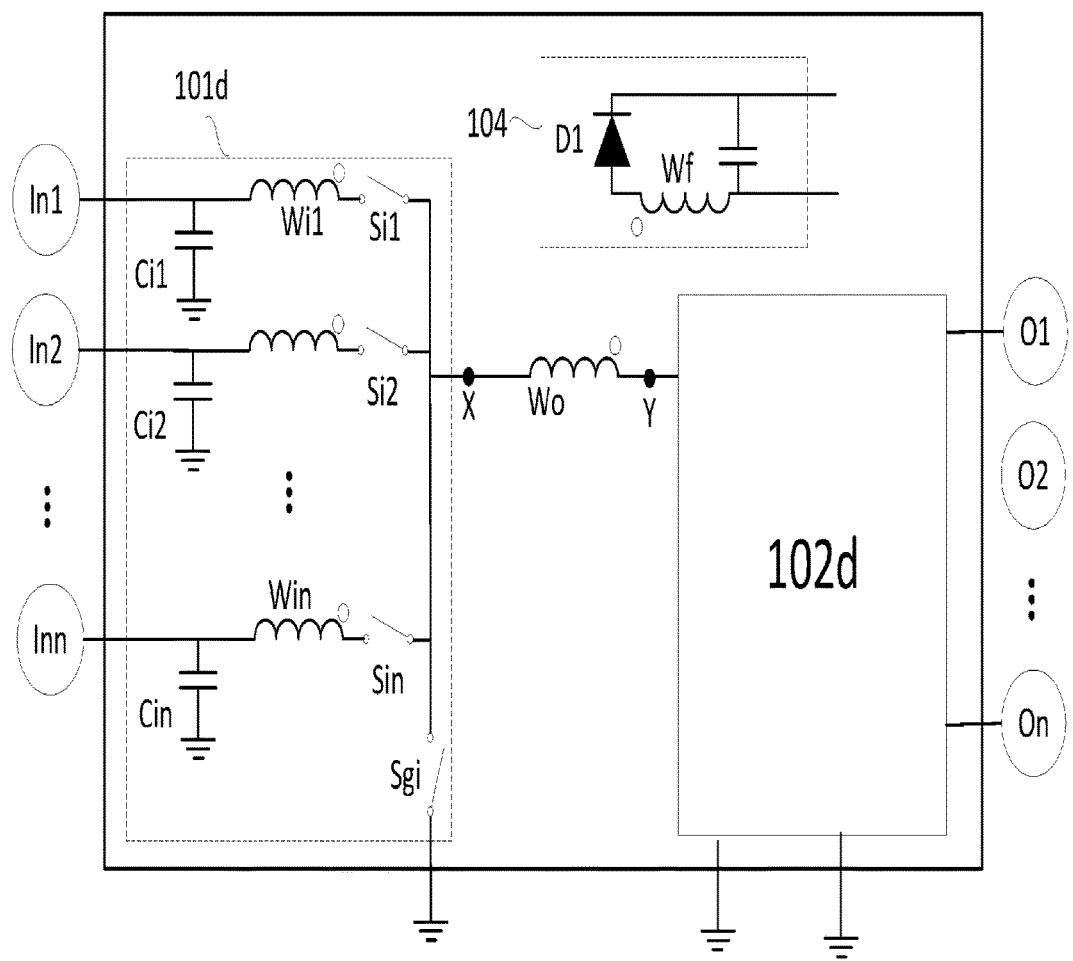
FIG. 1D is part schematic, part block diagram of a SIMO converter according to one or more illustrative embodiments.

Reference is now made to FIG. 1D, which shows a converter according to illustrative aspects of the disclosure herein. Converter 100d may be similar to converter 100c, with output circuit 102d differing from output circuit 102c of converter 100c in that output circuit 102d is shown having multiple connected output loads. A single converter may be designed to be used as converter 100c or as converter 100d (e.g., with multiple output connections available), with a user connecting as many loads to the converter output circuit as desired.

Figure 1E:
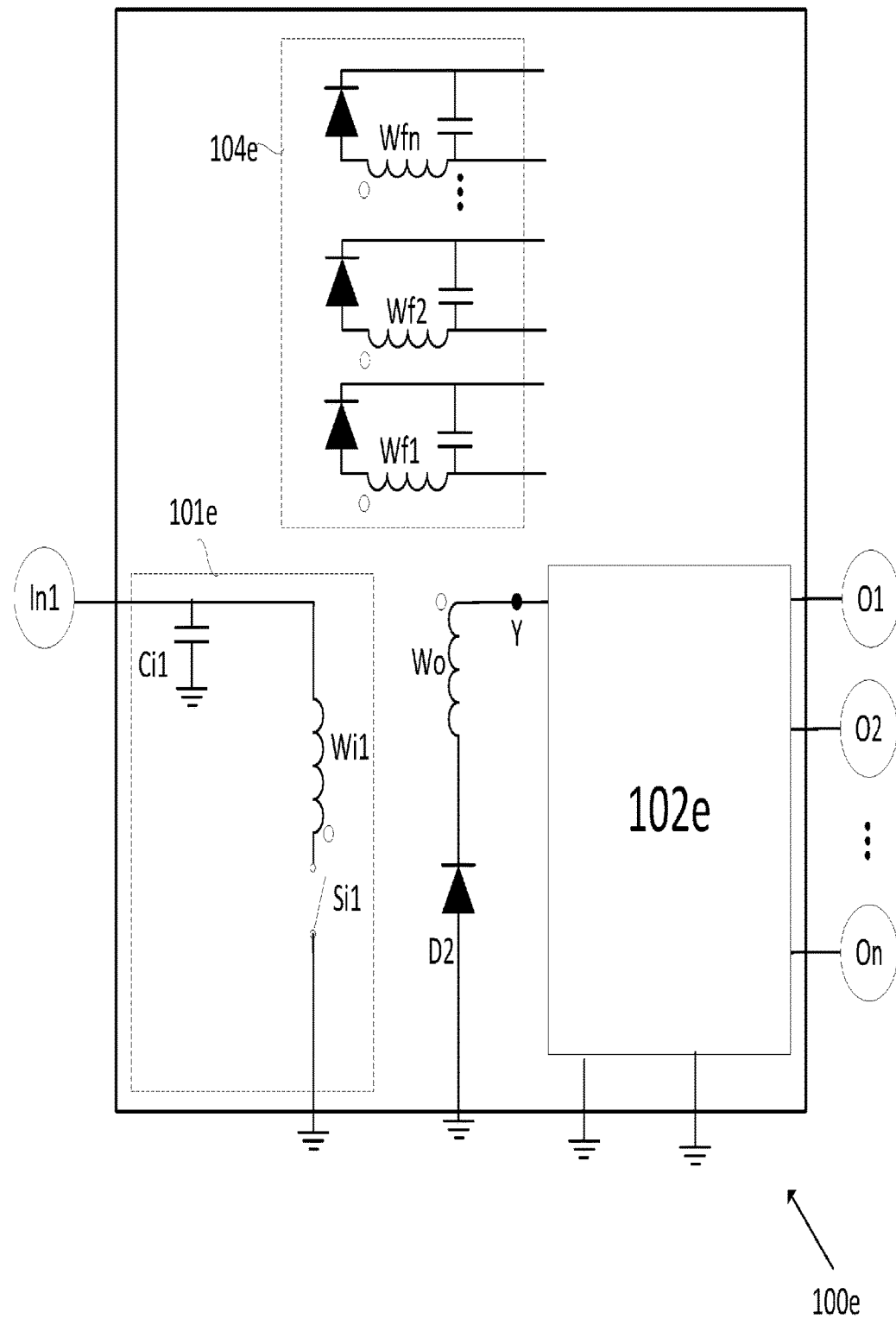
FIG. 1E is part schematic, part block diagram of a SIMO converter according to one or more illustrative embodiments.

Reference is now made to FIG. 1E, which shows a converter according to illustrative aspects of the disclosure herein. Converter 100e may comprise input circuit 101e, output circuit 102e and floating output circuit 104e. According to aspects of the disclosure herein, diode D2 may be replaced by a transistor that may be switched ON when bidirectional conduction is desirable, which may increase the efficiency of converter 100e. Input circuit 101e may comprise an input terminal for connecting to a power source, a capacitor Ci1 coupled between the input terminal and a reference terminal (e.g. ground), and a leg coupled in parallel to the capacitor, the leg comprising a winding $Wi_1$ and a switch $Si_1$. In the illustrative example of FIG. 1E, input circuit 101e has one input leg comprising winding $Wi_1$ and switch $Si_1$, the input leg connected to input power source $In_1$. According to additional aspects, more than one input leg and corresponding input power source may be featured. Output circuit 102e may be the same as or similar to output circuit 102d of FIG. 1D. Diode D2 may be connected in series with output winding Wo, to rectify output current flowing through Wo, and output winding Wo may be connected between diode D2 and node Y. Output circuit 102e and the anode of diode D2 may be configured to a similar or a different reference terminal than the reference terminal of input circuit 101e. Floating output circuit 104e may include an arrangement of multiple circuits similar to or the same as floating output circuit 104 of FIG. 1C and FIG. 1B. Each of windings Wf1-Wfn may be similar to winding Wf of FIG. 2D, and may be magnetically coupled (e.g., via a mutual magnetic core) to winding $Wi_1$ and/or winding $Wo_1$. Each winding of windings Wf1-Wfn may be coupled to a diode for rectifying a floating output voltage, and a capacitor for maintaining a regulated floating output voltage. Providing a floating output circuit having more than one floating voltage output may enable converter 100e to provide power (e.g., auxiliary power) using a floating voltage to multiple connected loads (e.g., a plurality of high-side switches in a main converter).

Figure 1F:
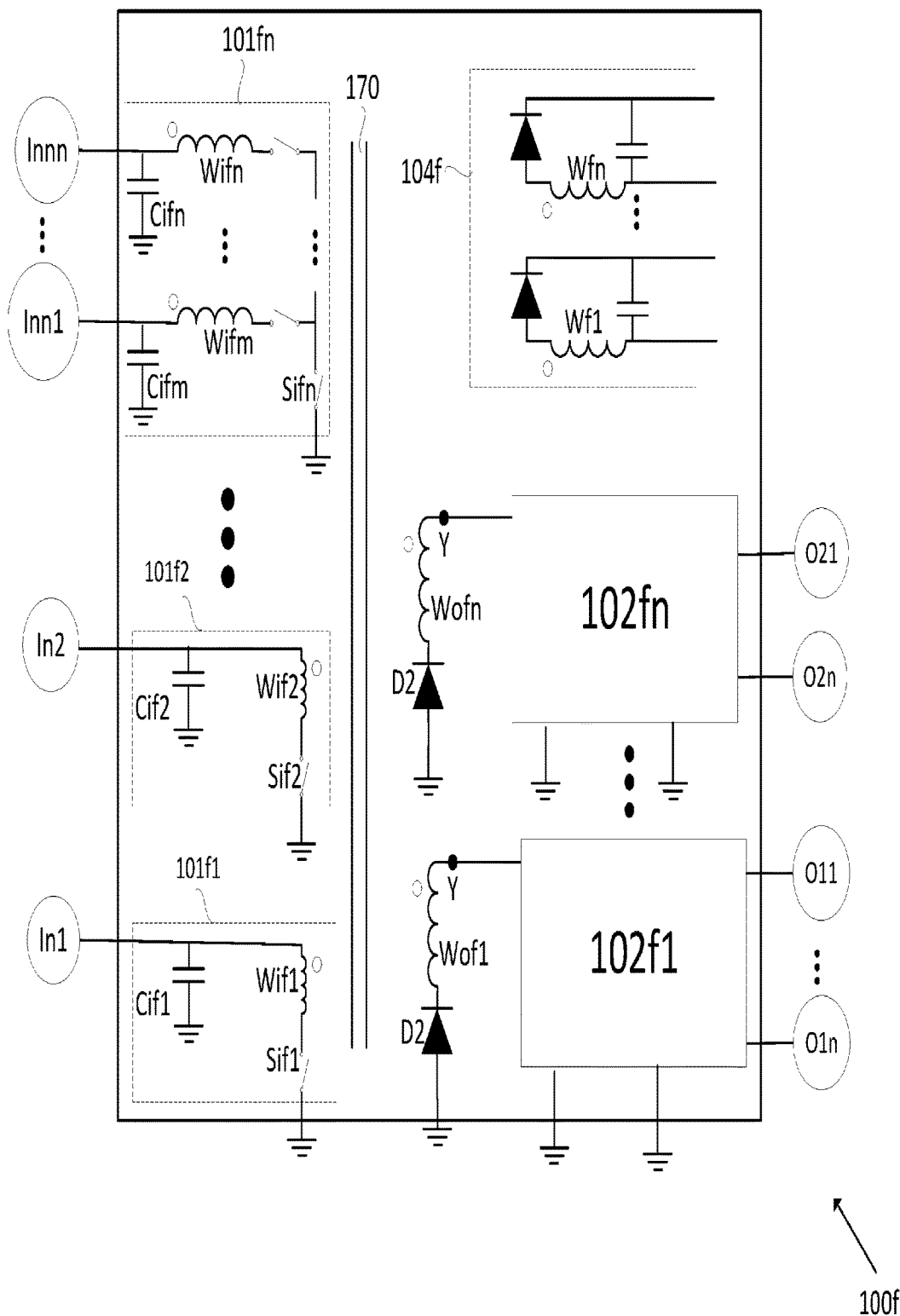
FIG. 1F is part schematic, part block diagram of a SIMO converter according to one or more illustrative embodiments.

Reference is now made to FIG. 1F, which shows a SIMO converter including multiple input circuits 101 and multiple output circuits 102 in accordance with aspects of the disclosure herein. Converter 100f may comprise input circuits $101_{f1} \ldots 101_{fn}$, output circuits $102_{f1} \ldots 102_{fn}$ and floating output circuit 104f. Each input circuit of input circuits $101_{f1} \ldots 101_{fn}$ may be similar to or the same as input circuits 101a-101e of FIGS. 1A-1E, and each output circuit of output circuits $102_{f1} \ldots 102_{fn}$ may be similar to or the same as output circuits 102a-102e of FIGS. 1A-1E. Inductive elements included in input circuits $101_{f1} \ldots 101_{fn}$, output circuits $102_{f1} \ldots 102_{fn}$ and floating output circuit 104f (e.g., windings $Wi_{f1} \ldots Wi_{fn}$, $Wo_{f1} \ldots Wo_{fn}$ and Wf1 . . . Wfn) may be magnetically coupled by being wound around a common magnetic core 170. Output circuits $102_{f1} \ldots 102_{fn}$ and the anode of diodes D2 may be configured to a similar or a different reference terminal than the reference terminals of input circuits $101_{f1} \ldots 101_{fn}$. The remaining elements may be structurally and/or functionally similar or the same as elements shown in FIGS. 1A-1E. Using a single magnetic core for coupling the inductive elements may provide certain advantages, for example, cost-saving, reduced size and/or increased efficiency. According to certain aspects of the disclosure herein, certain magnetic elements may be mutually coupled without full magnetic coupling between all circuit elements. For example, windings $Wi_{f1}$ may be magnetically coupled to windings $Wo_{f1}$ via a first magnetic core, and windings $Wi_{f2}$ may be magnetically coupled to windings $Wi_{fm}$, $Wi_{fn}$, $Wo_{fn}$, Wf2 and Wfn via a second magnetic core. Diode D2 may be replaced by a transistor that may be switched ON when bidirectional conduction is desirable, which may increase the efficiency of converter 100e.

Figure 2A:
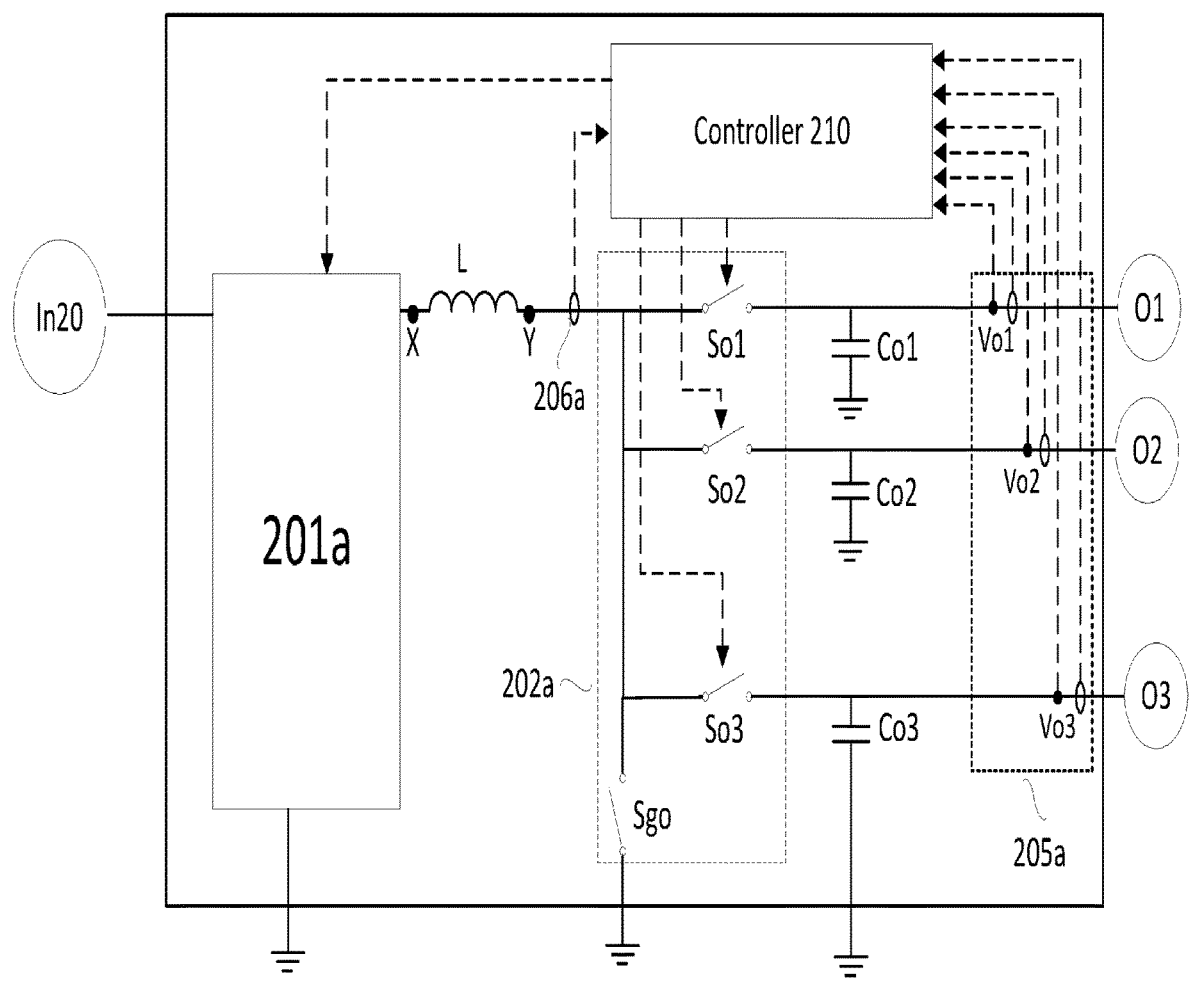
FIG. 2A is part schematic, part block diagram of a SIMO converter according to one or more illustrative embodiments.

Reference is now made to FIG. 2A, which shows a SIMO converter including a controller and sensors/sensor interfaces according to aspects of the disclosure herein. Converter 200a may be similar to or the same as any of converters 100a-100e of FIGS. 1A-1E respectively. In FIG. 2A, converter 200a is shown to be similar to converter 100a of FIG. 1A, with a single input power source connected to input circuit 201a. For simplicity, output circuit 202a is shown having three outputs, though fewer or additional outputs may be featured and are included in the disclosure herein. Sensors/sensor interfaces 205a may measure electrical or thermal parameters (e.g. voltage, current, power, temperature, etc.) at output circuit 202a. For example, sensors/sensor interfaces 205a may measure the voltage at each output terminal (e.g., Vo1, Vo2, Vo3) and/or the current flowing to a load connected at each output $O_1 \ldots O_n$. Sensors/sensor interfaces 205a may provide the measurements to controller 210, and controller 210 may control the operation of switches $So_1 \ldots So_3$ accordingly, to maintain the desired output voltages Vo1 . . . Vo3. According to some aspects, not all the sensors/sensor interfaces 205a might be necessary. For example, according to some aspects, voltage measurements or evaluations alone may suffice to enable controller 210 to regulate the output voltages Vo1 . . . Vo3.

Controller may be implemented variously. For example, controller 210 may be a microcontroller, digital signal processor (DSP), Field Programmable Gate Array (FPGA), Application Specific Integrated Circuit (ASIC) and/or an analog control device configured to evaluate or receive as inputs measurements obtained from sensors/sensor interfaces 205a and to output control voltage signals to switches $So_1 \ldots So_3$. Controller 210 may implement a different control method for each of switches $So_1 \ldots So_3$ according to differing requirements (e.g. voltage ripple tolerance, desired control response time, etc.) Methods for controlling switches $So_1 \ldots So_3$ will be disclosed below with regard to FIGS. 3A-3D.

Additional sensors/sensor interfaces (not explicitly shown) may be disposed to measure electrical parameters at or near input circuit 201a and provide the measurements to controller 210, with controller 210 configured to respond to the measurements and to control input circuit 201a (e.g., by controlling the operation of switches included in input circuit 201a according to, for example, MPPT considerations and/or to control the voltage available at terminal X).

Sensors/sensor interfaces 206a may be disposed to measure and/or estimate one or more electrical parameters (e.g. voltage, current) at or near inductor L (e.g. in switch Sgo, in input circuit 201a, etc.) and provide the measured and/or estimated value(s) to controller 210 (e.g. the triggering point of lowest current that is sufficient for charging the inductive element, for example inductor L). For example, sensors/sensor interfaces 206a may comprise a current sensor disposed in series with inductor L (e.g. at node Y or at node X) and may measure current flowing through inductor L. According to aspects of the disclosure herein (not explicitly shown in the figure), sensor/sensor interface 206a may measure voltage at one or more nodes (e.g., nodes X and Y) and controller 210 may use the voltage measurements (along with timing measurements, which may be provided by a clock included in controller 210) to estimate the current flowing through inductor L. The measured or estimated current flowing through inductor L may be used by controller 210 in determining a preferred method for operating switches $So_1$-$So_3$ and one or more switches (now shown) included in input circuit 201a. For example, controller may receive voltage measurements from sensors/sensor interfaces 205a indicating that output voltages Vo1-Vo3 are decreasing and approaching one or more minimum thresholds, and controller 210 may receive measurements from sensors/sensor interfaces 206a indicating that inductor L might not have sufficient current to compensate for the decrease in output voltages Vo1-Vo3. In this case, controller 210 may change (e.g., increase) a duty cycle of one or more switches included in input circuit 201a (e.g., switch Si1 of FIG. 1A) to increase a supply of current to inductor L and controller 210 may delay the compensation process in one or more cycles to charge the inductor with sufficient current.

For a first period of time during an operation cycle, switch Sgo may be ON, inductor L may be charged with current flowing from input circuit 201a, each of switches $So_1$-$So_3$ may be OFF, and storage devices (e.g. capacitors $Co_1$-$Co_3$) may discharge to provide current to loads connected at outputs $O_1$-$O_3$. According to illustrative aspects (e.g., in converter 200d as shown in FIG. 2D), switch Sgo might not be featured in output circuit 202a, and one of switches $So_1$-$So_3$ may be ON during the first period of time, providing a current path from inductor L to one of the output terminals Vo1-Vo3.

After inductor L has been charged during the first period of time, during a second period of time during the operation cycle, inductor L may discharge current to charge capacitors $Co_1$-$Co_3$. Switches $So_1$-$So_3$ may OFF at the start of the second period of time. A first output switch (e.g., switch $So_3$) may then be turned ON (e.g., by controller 210 applying a suitable control signal) and enable charging a corresponding capacitor (e.g., $Co_3$) by drawing current from inductor L. The first output switch may then be turned OFF, and a second output switch (e.g., switch $So_2$) may then be turned ON and enable charging a corresponding capacitor (e.g., $Co_2$) by drawing current from inductor L. The second output switch may then be turned OFF, and a third output switch (e.g., switch $So_1$) may then be turned ON and enable charging a corresponding capacitor (e.g., $Co_1$) by drawing current from inductor L. When all output capacitors have been sufficiently (might be partially or fully) charged or the current from inductor L has been depleted, the second period of time may end.

According to one or more illustrative embodiments, controller 210 may estimate and/or calculate by measurements or evaluations that the current from inductor L is about to be reduced below a predetermined value and/or to be depleted. In this scenario, controller 210 may turn OFF all output switches (e.g. $SO_2$, $So_3$) apart from output switch $So_1$ of terminal Vo1 (or of a different terminal coupled to a capacitor used as an energy reservoir the might not be coupled to a load). Controller 210 may turn ON output switch $So_1$, charging the corresponding capacitor (e.g., $Co_1$) with the energy left in the inductor.

According to one or more illustrative embodiments, energy storage in the reservoir (e.g., $Co_1$) may provide certain advantages, such as a reduction of associated switching losses by enabling a reverse current (e.g. current flowing from Y to X) and/or reserve energy to compensate a second output (e.g., $Co_2$) at the expense of a first output (e.g., $Co_1$) by a priority-based method, which may lead to an increase in converter efficiency, robustness and accuracy.

Controller may determine the order in which capacitors $Co_1$-$Co_3$ will be charged according to various methods. For example, a predetermined charging order may be used. As another example, a priority-based charging order may be used, with certain capacitors always having higher priority than other capacitors. For example, capacitor $Co_3$ may be coupled to a load highly sensitive to voltage fluctuations, and may be always charged first as long as the sensitive load is connected.

Controller 210 may determine the suitable period of time for charging each capacitor according to various methods. For example, each capacitor may receive an equal amount of charging time (unless a capacitor does not require the entire charging time, in which case the charging time may be shorter). As another example, a priority-based scheme may be used, whereby a high priority capacitor is charged until the desired voltage is reached, and only then the next-priority capacitor is charged. If inductor L does not have sufficient current to fully charge all the capacitors, the high-priority capacitors may be fully charged and the low-priority capacitors may be partially charged or not charged at all until the next charging cycle.

Controller 210 may regulate the length of the first period of time (for charging inductor L), the length of the second period of time (for discharging inductor L and charging capacitors $Co_1$-$Co_3$), the charging current available to inductor L during the first period of time, and the charging current available to capacitors $Co_1$-$Co_3$ during the second period of time to enable inductor L to provide and maintain the desired voltages Vo1-Vo3. Controller 210 may change the length of and/or the current during the first period of time and the second period of time according to load variations using control methods, for example compensation techniques.

Figure 2B:
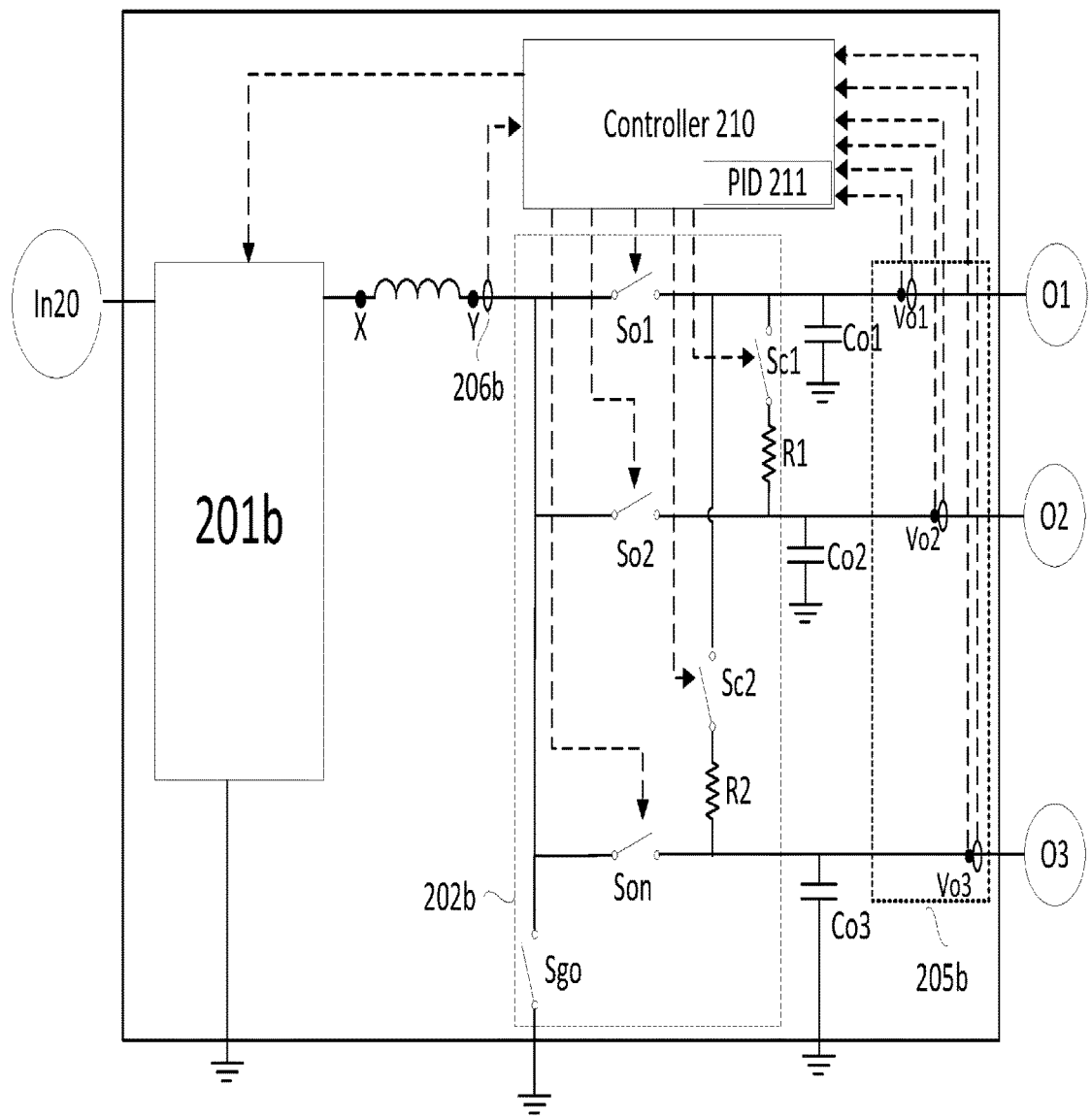
FIG. 2B is part schematic, part block diagram of a SIMO converter according to one or more illustrative embodiments.

Reference is now made to FIG. 2B, which illustrates a SIMO converter according to illustrative aspects of the disclosure herein. Converter 200b may be similar to converter 200a of FIG. 2A, with elements corresponding to similarly-referenced elements of converter 200a. Output circuit 202b may comprise one or some compensation legs connected between a first output terminal (e.g. Vo1) and a second output terminal (e.g. Vo2, Vo3). A first compensation leg comprising a resistor R1 connected in series with a switch Sc1 (e.g. a MOSFET, IGBT, BJT, JFET or other suitable kind of switch) may be connected between the positive-voltage terminals of capacitors $Co_1$ and $Co_2$, and a second compensation leg comprising a resistor R2 connected in series with a switch Sc2 may be connected between the positive-voltage terminals of capacitors $Co_1$ and $Co_3$. Switches Sc1 and Sc2 may be controlled (e.g. by controller 210) to compensate for a decrease in voltages Vo2 and Vo3 by drawing charge from capacitor $Co_1$, as will be explained in greater detail below.

Controller 210 may be implemented similarly to controller 210. A control loop implementing different control method (proportional control, proportional-integral control, etc.) may be applied to regulate output voltages Vo1-Vo3. FIG. 2B exhibits a Proportion-Integrator-Derivative (PID) control loop to regulate output voltages Vo1-Vo3. The input to control loop 211 may be one or more measurements of output voltages Vo1-Vo3 (or one or more estimates of output voltages Vo1-Vo3), and the output of control loop 211 may be a switch control output configured to control one or more switches of input circuit 201b. Advantages of using a PID control loop may include robustness, efficiency and accuracy. However, certain alternative control loops may provide a speed advantage over PID control loops, which may be preferable for certain types of loads. According to illustrative features of the disclosure herein, output voltages Vo2 and/or Vo3 may be regulated by fast control loops, and the first and second compensation legs may be activated (by closing switches Sc1 and/or Sc2 ON) in response to a fast control loop detecting a reduction in voltage Vo2 and/or voltage Vo3 below a predetermined threshold value. Capacitor Co1 may provide charge for increasing voltages Vo2 and/or Vo3, and the subsequent decrease in Vo3 due to the discharge of capacitor $Co_1$ may be compensated for by the PID controller in the next control cycle.

Resistors R1 and R2 may be sized to provide a rapid charging of capacitors Co2 and/or Co3 in response to a decrease in voltages Vo2 and/or Vo3 below a predetermined threshold value, while sufficiently restraining the charging current to prevent damage to converter 200b or components thereof. For example, resistors R1 and R2 may have a resistance of several ohms, or 10 or 20 ohms. According to some aspects, switches Sc1 and Sc2 may include inherent parasitic resistance which may be sufficient to regulate the charging.

According to a determination, the operating compensation leg may be deactivated (for example, by opening switches Sc1 and/or Sc2 OFF). A determination to deactivate the compensation leg may be made according to different factors. For example, such a determination can be made according to a clock which limits the operation time of the compensation leg. The operation time is calculated to ensure that there is enough power in capacitor $Co_1$ to compensate the corresponding output terminal. In case that the voltage at the compensated output terminal (voltage Vo2 and/or voltage Vo3) has not reached the required value the compensation may continue in the following cycles and may be fixed by a different control loop in the system. As another example, such a determination can be made after obtaining a voltage measurement at the compensated output terminal (voltage Vo2 and/or voltage Vo3), and determining that the voltage measurement is above or equal to a second reference value.

Figure 2C:
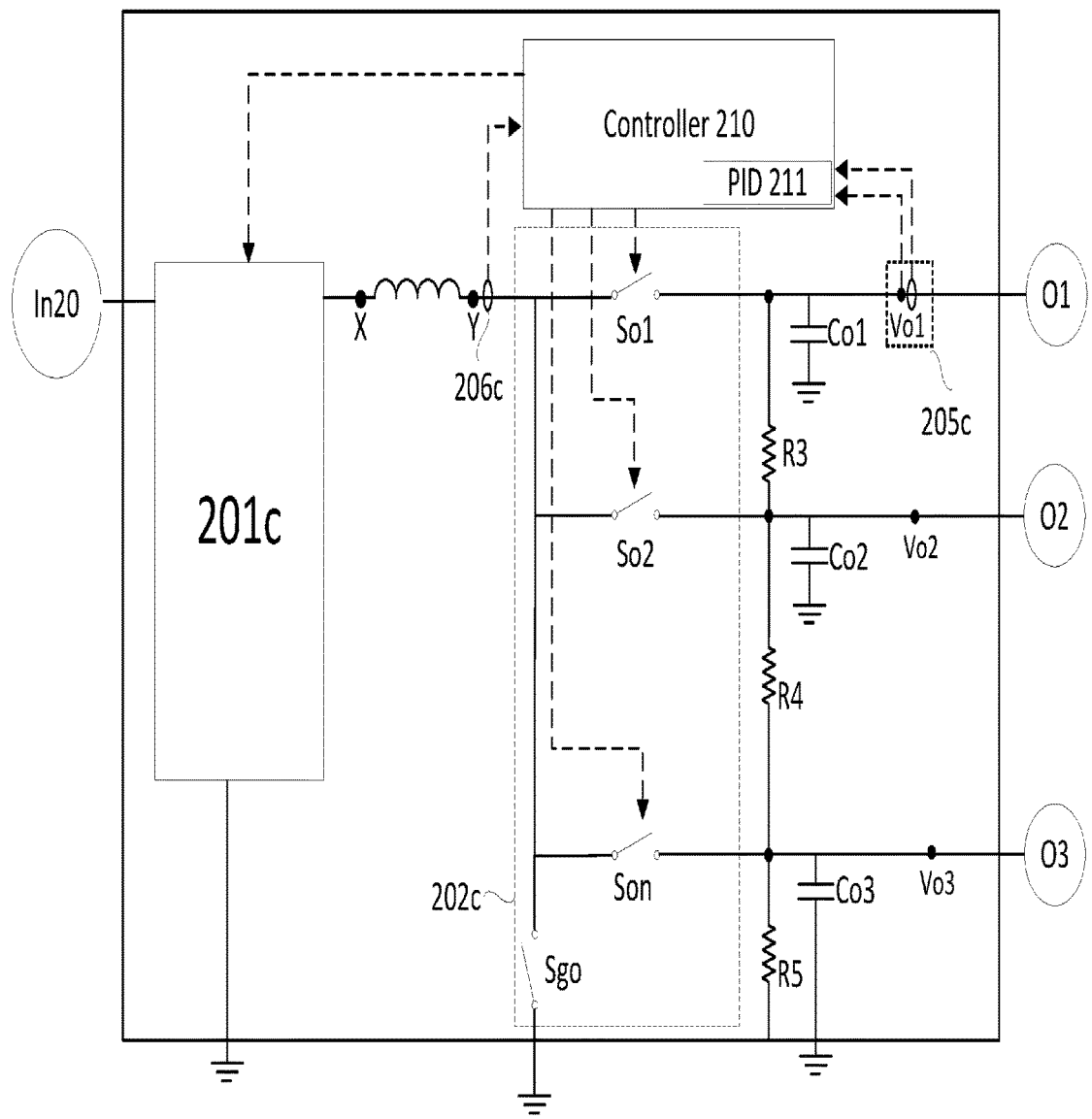
FIG. 2C is part schematic, part block diagram of a SIMO converter according to one or more illustrative embodiments.
Figure 2D:
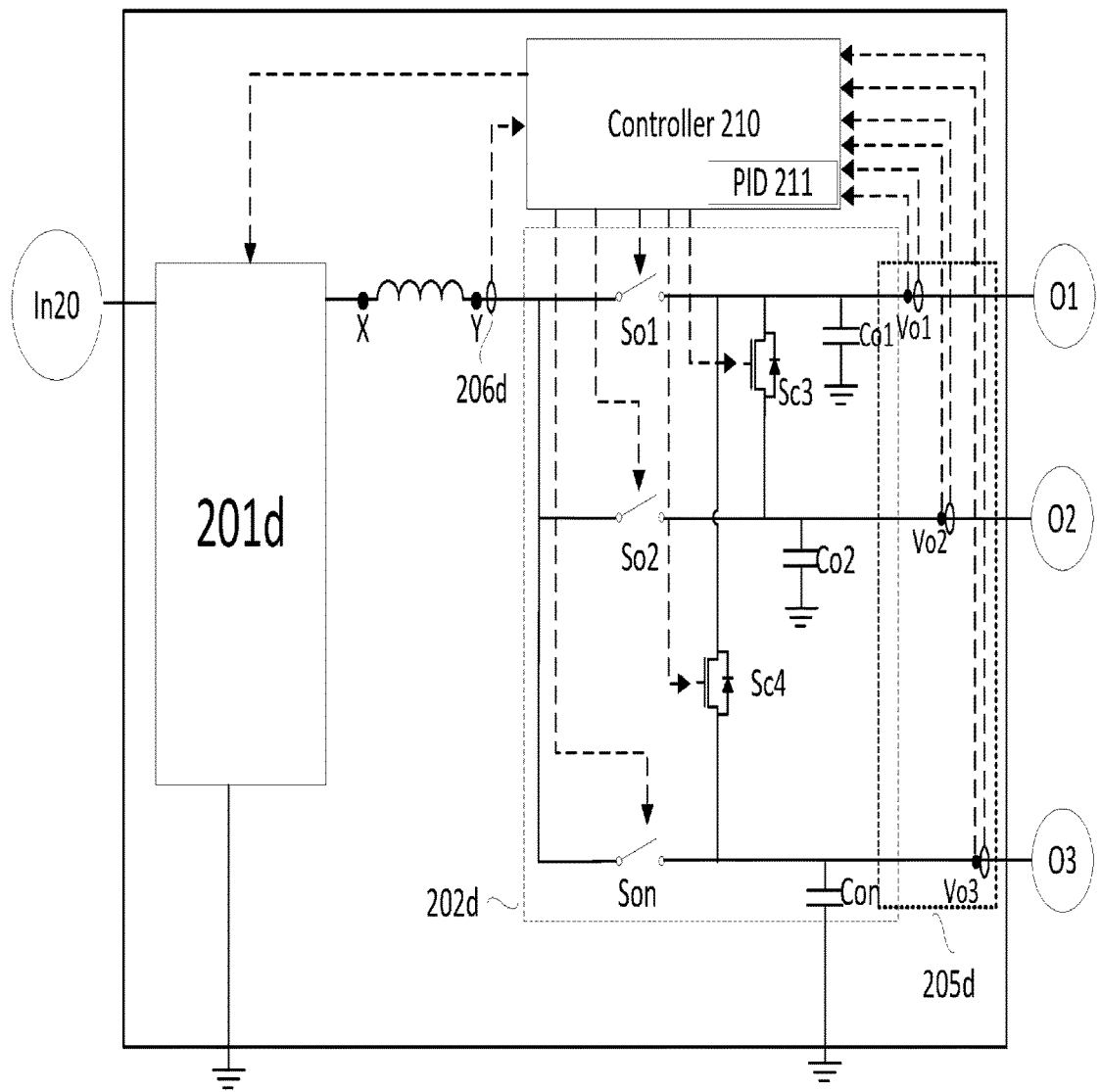
FIG. 2D is part schematic, part block diagram of a SIMO converter according to one or more illustrative embodiments.

Reference is now made to FIG. 2C which illustrates a SIMO converter according to illustrative aspects of the disclosure herein. Converter 200c may be similar to converter 200b of FIG. 2B, with elements corresponding to similarly-referenced elements of converter 200a and/or converter 200b. Output circuit 202c may comprise one or some compensation legs. A first compensation leg may comprise a resistor R3 and may be connected between the positive-voltage terminals of capacitors $Co_1$ and $Co_2$, a second compensation leg comprising a resistor R4 may be connected between the positive-voltage terminals of capacitors $Co_2$ and $Co_3$, and a third compensation leg comprising a resistor R5 may be connected between the positive-voltage terminal of capacitors $Co_3$ and a reference terminal. By proper selection of resistor values for resistors R3-R5, a single voltage among Vo1-Vo3 may be actively regulated, and resistors R3-R5 may serve to fix the voltage at terminals Vo1 and Vo3 as a percentage of the voltage at terminal Vo1.

Controller 210 may comprise control loop 211, for example a PID control loop, configured to regulate the voltage at output terminal Vo1 according to a value, and further configured to regulate the voltages at output terminals Vo2 and Vo3 as voltages derived from the voltage at Vo1. As a numerical example, controller 210 may control the voltage at output terminal Vo1 to be 12V. The desired voltage at terminal Vo2 may be 5V, and the desired voltage at terminal Vo3 may be 3V. In one, non-limiting example, resistors may be selected as follows: R5=3Ω, R4=2Ω, R3=7Ω. In this example, if the voltage is 12V at terminal Vo1, the voltage at Vo2 will be $$Vo2 = Vo1 \frac{R4 + R5}{R3 + R4 + R5} = 12\ V\ \frac{2\Omega + 3\Omega}{7\Omega + 2\Omega + 3\Omega} = 5\ V$$

and the voltage at terminal Vo3 will be $$Vo3 = Vo1 \frac{R5}{R3 + R4 + R5} = 12\ V\ \frac{3\Omega}{7\Omega + 2\Omega + 3\Omega} = 3\ V.$$

If the voltage at terminal Vo2 or the voltage at terminal Vo3 decreases (e.g., due to a load at output $O_2$ or a load at output $O_3$ drawing current from capacitor $Co_2$ or capacitor $Co_3$), the voltage may be partially compensated by drawing current from capacitor $Co_1$, and controller 210 may compensate for the decrease the voltage at terminal Vo1 during the next switching cycle. An advantage of this implementation of voltage-control at terminals Vo1, Vo2 and Vo3 may be simplicity and a reduced count of voltage-control loops. According to illustrative aspects of the disclosure herein resistors R3-R5 of FIG. 2C may be replaced by switches.

Reference is now made to FIG. 2D, which illustrates a SIMO converter according to illustrative aspects of the disclosure herein. Converter 200d may be similar to converter 200b of FIG. 2B, with elements corresponding to similarly-referenced elements of converter 200b. Output circuit 202d may comprise one or some compensation legs. A first compensation leg may comprise a switch Sc3 (which is shown as a MOSFET, but may also be an IGBT, BJT, JFET or other suitable kind of switch) that may be connected between the positive-voltage terminals of capacitors $Co_1$ and $Co_2$, and a second compensation leg comprising a switch Sc4 may be connected between the positive-voltage terminals of capacitors $Co_1$ and $Co_3$. Switches Sc3 and Sc4 may be controlled (e.g. by controller 210) to regulate voltages Vo2 and Vo3 by providing a controllable voltage drop across the terminals of each switch. For example, controller 210 may maintain (e.g., using a PID control loop) the voltage at terminal Vo1 at about 12V and switch Sc3 may comprise a MOSFET with the drain terminal connected to terminal Vo1 and the source connected to terminal Vo2. Controller 210 may control the gate terminal voltage of switch Sc3 to create a conduction channel through switch Sc3 resulting in a drain to source voltage across switch Sc3 such that the voltage at terminal Vo2 is about 3V. Responsive to a determination (e.g., by measurements obtained from sensors/sensor interfaces 205d) that the voltage at terminal Vo2 is below 3V, controller 210 may change (e.g. increase, if switch Sc3 is an N-type MOSFET) the gate terminal voltage of switch Sc3 to reduce the drain to source voltage of switch Sc3 and increase the voltage of terminal Vo2. This method of controlling the voltages at terminals Vo2 and Vo3 may provide advantages of simplicity and speed.

According to illustrative embodiments of the disclosure herein, terminal Vo1 (or a different terminal coupled to a capacitor used as an energy reservoir for compensating voltage at other terminals) might not be coupled to a load. For example, the load coupled at output $O_1$ might be removed, and the voltage at capacitor $Co_1$ may be controlled (e.g., by a PI or a PID control loop) to maintain a voltage (e.g., 12V), and compensation circuits may be activated to draw current from capacitor $Co_1$ to compensate the voltages at terminals Vo2 and Vo3. This arrangement may provide certain benefits, for example, not affecting a load current when providing compensation to certain circuit terminals.

According to illustrative embodiments of the disclosure herein, in one or some period of time of a switching cycle terminal, Vo1 (or a different terminal coupled to a capacitor used as an energy reservoir for compensating voltage at other terminals) may charge inductor L by a current flowing through the corresponding switch (e.g. switch Sol) that may then be turned ON and the rest of the output switches may be turned OFF (and may require specific operation modes of the components in input circuit 201d). Enabling a current flowing from the reservoir to the inductor may provide certain advantages, such as a reduction of associated switching losses, which may lead to an increase in converter efficiency.

Figure 2E:
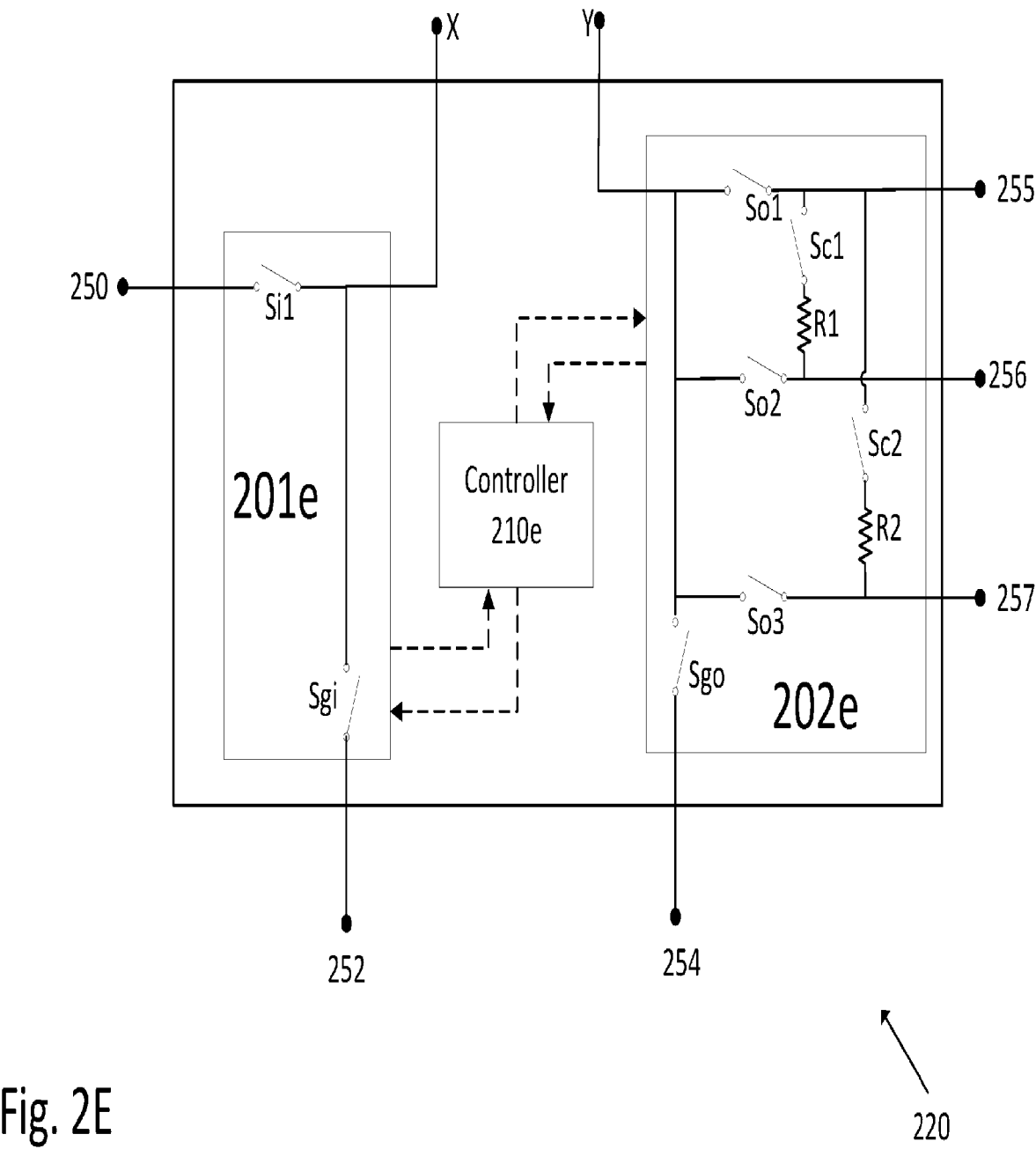
FIG. 2E is part schematic, part block diagram of an integrated circuit for a SIMO converter according to one or more illustrative embodiments.

Reference is now made to FIG. 2E, which shows a circuit for a SIMO converter according to illustrative aspects of the disclosure herein. Circuit 220 may provide circuitry common to various aspects and embodiments of the disclosure herein, and may provide connection terminals for connecting additional discrete components according to a particular desired features. Circuit 220 may be designed and manufactured as an integrated circuit (IC) providing functionality for implementing a wide variety of converter topologies.

Input circuit 201e may comprise one or more switches. For example, input circuit 201e may comprise switches Sgi and $Si_1$ interconnected as shown in FIGS. 1A-1B. At least one terminal may be provided for connecting to one or more reference terminals (e.g., ground). For example, terminal 252 may correspond to the ground terminal of FIG. 1A. One or more input terminals may be provided for connecting to a power source. In the illustrative example of FIG. 2E, a single input terminal 250 is provided. According to additional features, additional input terminals may be provided, and additional corresponding switches (e.g., similar to or the same as switches $Si_2 \ldots Si_n$, of FIG. 1A) may be provided. Terminal X may be provided for connection to a magnetic device, for example, an inductor such as inductor L of FIG. 1A or a winding such as W1 of FIG. 1B. Capacitors connected to input terminals (e.g., capacitors $Ci1 \ldots Cin$ of FIG. 1A) may be integrated as part of input circuit 201e (for example, when a required capacitor size is pre-known or generic) or may be externally connected to the circuit.

Output circuit 202e may comprise one or more switches. For example, according to the illustrative example of FIG. 2E, output circuit 202e is shown having three output terminals 255, 256 and 257, a corresponding output capacitor $Co_1$, $Co_2$ and $Co_3$, and a switch connecting each output terminal to node Y (switches $So_1$, $So_2$, and $So_3$, respectively). An additional switch Sgo may be connected between node Y and a common terminal 254. In addition, output circuit 202e may comprise one or some compensation legs connected between a first output terminal (e.g. 255) and a second output terminal (e.g. 256). In some illustrative embodiments the compensation legs may comprise different components or the same components in a different formation. For example, each compensation leg in FIG. 2E comprises of a switch configured to the first output terminal in series with a resistor while in some embodiments the resistor may be configured to the first output terminal.

Controller 210e may be operatively attached to input circuit 201e and output circuit 202e, and may control the switches comprised thereby. Controller 210e may be implemented similarly to controllers 210a-d discusses above. Controller 210e may be, for example, a microcontroller, digital signal processor (DSP), Field Programmable Gate Array (FPGA), Application Specific Integrated Circuit (ASIC) and/or an analog control device.

Controller 210e may be configured to carry out one or more control methods for operating the switches of input circuit 201e and output circuit 202e, with a method selected according to user-configurable options and a particular application of circuit 220.

An advantage of circuit 220 may be providing a flexible control and switching framework for implementation of any of several converter topologies. For example, input circuit 201e may be used, for example, as part of input circuits 101a-101d of FIGS. 1A-1D and output circuit 202e may be used as part of output circuits 102a-102d of FIGS. 1A-1D and output circuits 202a-202c of FIGS. 2A-2C. Operational and control-related parameters may enable circuit 220 to implement various circuit features disclosed herein. For example, switches Sc1 and Sc2 may be controllably switched to implement output circuit 202b of FIG. 2B, and switches Sc1 and Sc2 may be kept in the ON state to implement output circuit 202c of FIG. 2C. As another example, switch Sgo may be kept in the OFF state to implement the Sgo-less implementation of output circuit 202d of FIG. 2D, and additional switches (not explicitly depicted) may be coupled in parallel to resistors R1 and R2 and may be kept ON to short-circuit resistors R1 and R2 to implement the resistor-less implementation of output circuit 202d of FIG. 2D.

Figure 2F:
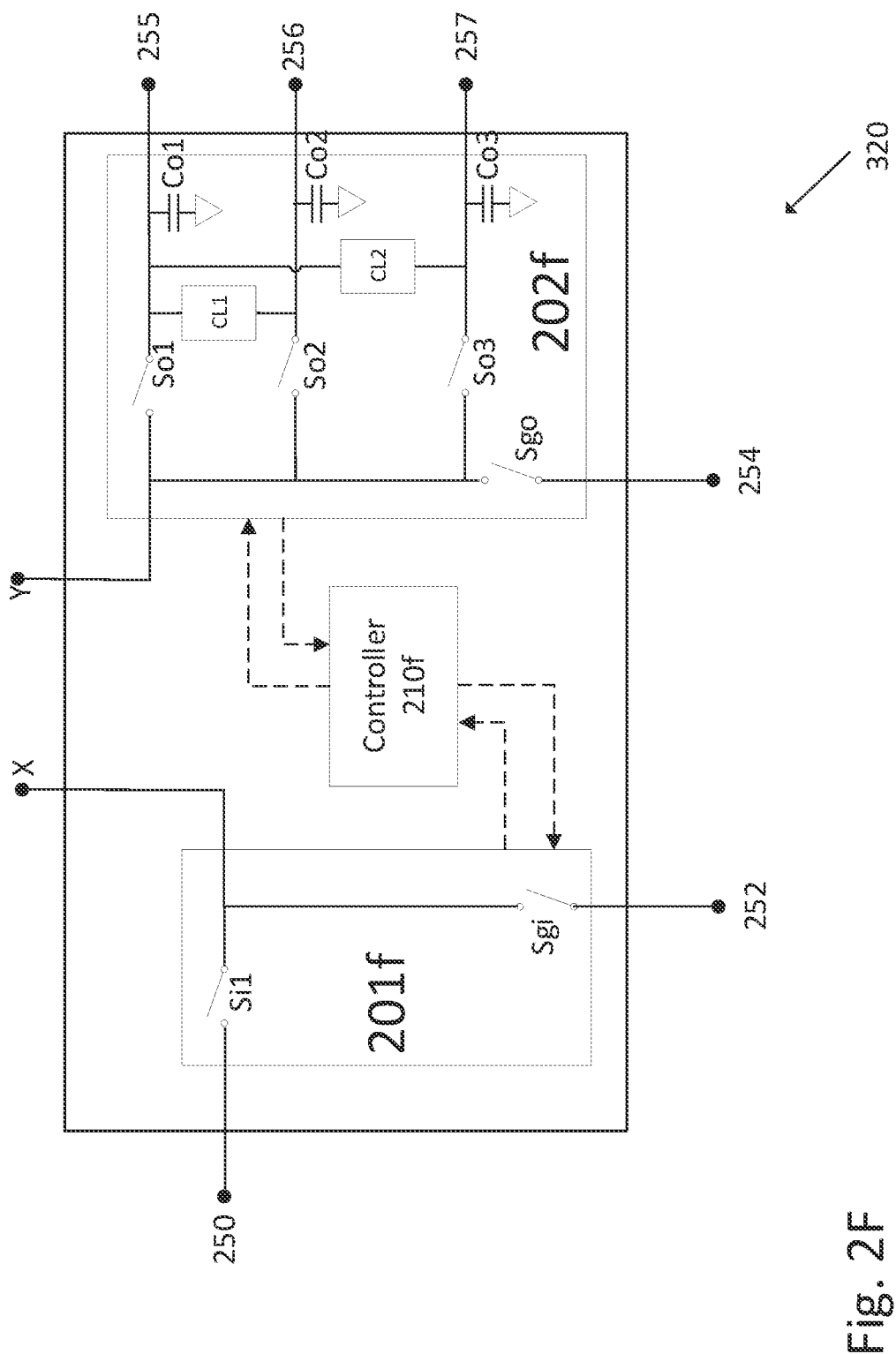
FIG. 2F is part schematic, part block diagram of a SIMO converter according to one or more illustrative embodiments.

Reference is now made to FIG. 2F, which shows a circuit for a SIMO converter according to illustrative aspects of the disclosure herein. Circuit 220 may provide circuitry common to various aspects and embodiments of the disclosure herein, and may provide connection terminals for connecting additional discrete components according to a particular desired features. Circuit 320 may be designed and manufactured as an integrated circuit (IC) providing functionality for implementing a wide variety of converter topologies.

Input circuit 201f may comprise one or more switches. For example, input circuit 201f may comprise switches Sgi and $Si_1$ interconnected as shown in FIGS. 1A-1B. At least one terminal may be provided for connecting to one or more reference terminals (e.g., ground). For example, terminal 252 may correspond to the ground terminal of FIG. 1A. One or more input terminals may be provided for connecting to a power source. In the illustrative example of FIG. 2F, a single input terminal 250 is provided. According to additional features, additional input terminals may be provided, and additional corresponding switches (e.g., similar to or the same as switches $Si_2 \ldots Si_n$ of FIG. 1A) may be provided. Terminal X may be provided for connection to a magnetic device, for example, an inductor such as inductor L of FIG. 1A or a winding such as W1 of FIG. 1B. Capacitors connected to input terminals (e.g., capacitors $Ci1 \ldots Cin$ of FIG. 1A) may be integrated as part of input circuit 201f (for example, when a required capacitor size is pre-known or generic) or may be externally connected to the circuit.

Output circuit 202f may comprise one or more switches. For example, according to the illustrative example of FIG. 2F, output circuit 202f is shown having three output terminals 255, 256 and 257, a corresponding output capacitor $Co_1$, $Co_2$ and $Co_3$, and a switch connecting each output terminal to node Y (switches $So_1$, $So_2$, and $So_3$, respectively). An additional switch Sgo may be connected between node Y and a common terminal 254. Terminal 252 and terminal 254 may be about the same reference voltage (e.g. ground) or different than each other. In addition, output circuit 202e may comprise one or some compensation legs connected between a first output terminal (e.g. 255) and a second output terminal (e.g. 256). In some illustrative embodiments the compensation legs may comprise different components or the same components in a different formation. For example, each compensation leg in FIG. 2F comprises of a switch configured to the first output terminal in series with a resistor while in some embodiments the resistor may be configured to the first output terminal.

Controller 210f may be operatively attached to input circuit 201f and output circuit 202f, and may control the switches comprised thereby. Controller 210f may be implemented similarly to controllers 210a-d discusses above. Controller 210f may be, for example, a microcontroller, digital signal processor (DSP), Field Programmable Gate Array (FPGA), Application Specific Integrated Circuit (ASIC) and/or an analog control device.

Controller 210f may be configured to carry out one or more control methods for operating the switches of input circuit 201f and output circuit 202f, with a method selected according to user-configurable options and a particular application of circuit 320.

An advantage of circuit 320 may be providing a flexible control and switching framework for implementation of any of several converter topologies. For example, input circuit 201f may be used, for example, as part of input circuits 101a-101d of FIGS. 1A-1D and output circuit 202f may be used as part of output circuits 102a-102d of FIGS. 1A-1D and output circuits 202a-202c of FIGS. 2A-2C. Operational and control-related parameters may enable circuit 320 to implement various circuit features disclosed herein. For example, CL1 is a compensation leg configured between a first output terminal (e.g. 255) and a second output terminal (e.g. 256) and CL2 is a compensation leg configured between a first output terminal (e.g. 255) and a third output terminal (e.g. 257).

Figure 2G:
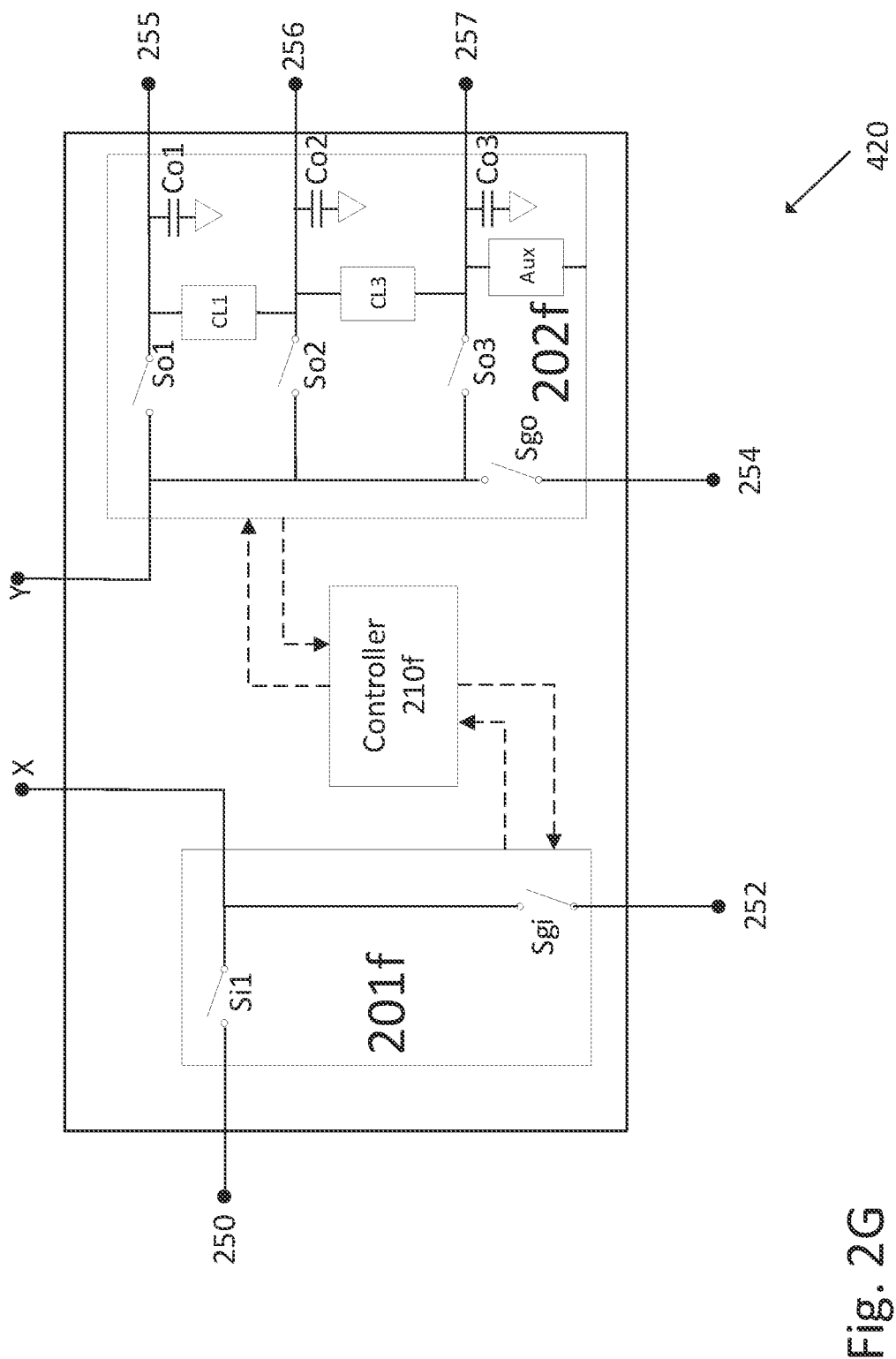
FIG. 2G is part schematic, part block diagram of a SIMO converter according to one or more illustrative embodiments.

Reference is now made to FIG. 2G which comprises the same features as FIG. 2F except for the difference in the configuration of the voltage compensation legs in circuit 420. Instead of connecting the second compensation leg (e.g. CL2) as shown in FIG. 2F, between the first output terminal (e.g. 255) and the third output terminal (e.g. 257), compensation leg CL3 in FIG. 2G is connected between the second output terminal (e.g. 256) and the third output terminal (e.g. 257) in series with compensation leg CL1. According to features of certain embodiments, circuit 420 may comprise a plurality of output terminals and corresponding compensation legs. In some illustrative embodiments, circuit 420 may comprise an additional auxiliary leg Aux to draw current through the compensation legs.

Sensors/sensor interfaces 205a-d and 206a-d of FIGS. 2A-2D may be integrated in one or more of circuits 220, 320 and 420 of FIGS. 2E, 2F and 2G correspondingly (though not shown explicitly) or externally provided and connected when connecting circuit 220 to additional components to form an operational converter.

Figure 3A:
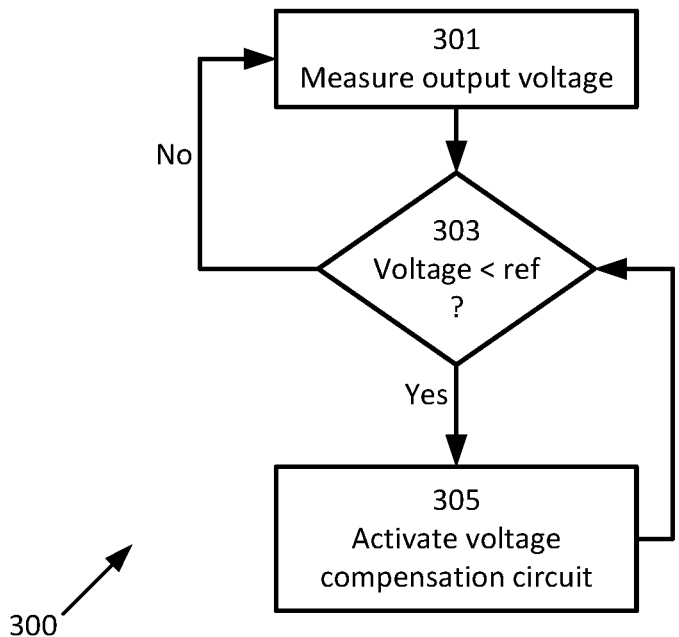
FIG. 3A illustrates a method for operating a SIMO converter according to one or more illustrative embodiments.

Reference is now made to FIG. 3A, which shows a flow diagram of a method for regulating an output voltage, according to one or more features of the disclosure herein. Method 300 may be carried out by a controller such as controllers 210 of FIGS. 2A-2D, or controller 210e of FIG. 2E, and may be applied to converters having active compensation circuits (e.g., converters 200b, 200d and 200e). At step 301, the controller carrying out method 300 may measure or determine (e.g. by receiving a measurement from sensors/sensors interfaces 205b or estimating, based on one or more measurements received from sensors/sensors interfaces 205b), a regulated voltage at an output terminal (e.g. terminal Vo2 or Vo3). The controller may then proceed to step 303, and compare the regulated voltage to a corresponding reference voltage. If the regulated voltage is at or above the reference voltage, the controller may loop back to step 301, and after a period of time, repeat step 301. If the regulated voltage is determined to be below the reference voltage, the controller may proceed to step 305, and activate the voltage compensation circuit.

Activation of the voltage compensation circuit may depend on the particular converter topology being controlled by method 300. For example, with respect to converter 200b, activating the voltage compensation circuit may include closing one or more switches (e.g., Sc1), which may cause a capacitor (e.g. Co2) coupled to the regulated voltage terminal (e.g. Vo2) to begin drawing current from Co1 and thereby possibly increasing the regulated voltage at terminal Vo2. As another example, with respect to converter 200d, activating the voltage compensation circuit may include adjusting the voltage applied to a switch (e.g. Sc3) gate, thereby adjusting the voltage drop across the switch (e.g., Sc3), which may cause a capacitor (e.g. Co2) coupled to the regulated voltage terminal (e.g. Vo2) to begin drawing current from Co1 and thereby possibly increasing the regulated voltage at terminal Vo2. If a voltage compensation circuit is already active when reaching step 305, the voltage compensation circuit may be maintained in an active state.

After activating the voltage compensation circuit, the controller may loop back to step 303 and, after a period of time, compare the regulated voltage to the relevant reference voltage.

Method 300 may be carried out by a first control loop included in the controller, with a second control loop included in the controller regulating a different output voltage. For example, the controller may regulate the voltage at terminal Vo2 using a control loop implementing method 300 (e.g. hysteretic control), and the controller may regulate the voltage at terminal Vo1 using a PID control loop. Method 300 may be faster than a PID control loop, which may lead to a decrease in the voltage at terminal Vo2, the decrease being compensated for by drawing current from terminal Vo1, and the PID control loop may then regulate to voltage at terminal Vo1. Advantages of this split-control-loop design may include fast regulation of voltage at sensitive output voltage terminals, with a robust and exact controller regulating a less-sensitive output voltage terminal to compensate for the sensitive terminals and still maintain a desired output voltage at the less-sensitive terminal.

Figure 3B:
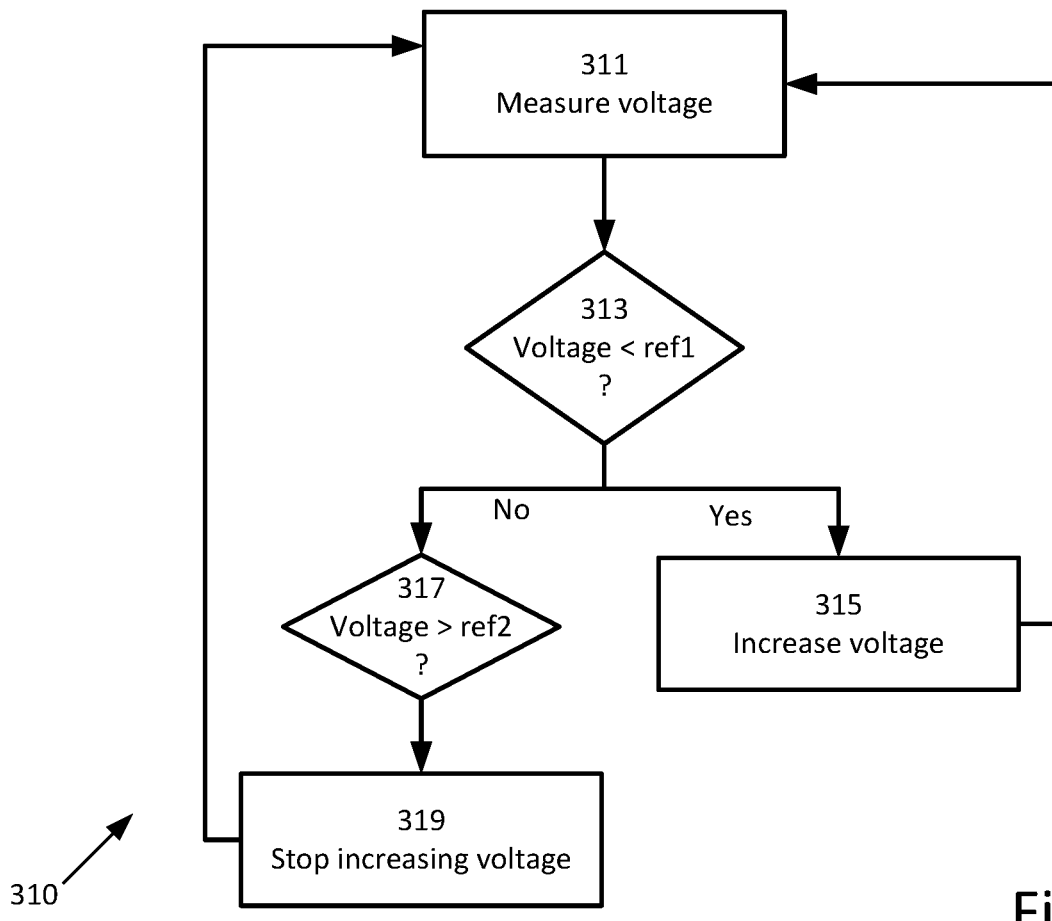
FIG. 3B illustrates a method for operating a SIMO converter according to one or more illustrative embodiments.

Reference is now made to FIG. 3B, which shows a flow diagram of a method for regulating an output voltage, according to one or more features of the disclosure herein. Method 310 may be carried out by a controller such as controllers 210 of FIG. 2A-2D, or controller 210e of FIG. 2E, and may be applied to converters 200a-200e. At step 311, a regulated voltage (e.g. at terminals Vo1 or Vo2) may be measured and/or determined by the controller. At step 313, the controller may compare the regulated voltage to a first reference voltage. If the regulated voltage is below the first reference voltage, the controller may proceed to step 315 and increase the regulated voltage. Increasing the regulated voltage may be variously implemented, and may depend on the converter topology. For example, with regard to converter 200a of FIG. 2A, increasing the voltage at terminal Vo2 may include increasing a duty cycle of switch $So_2$. As another example, with regard to circuit 220 of FIG. 2E, increasing the voltage at terminal 257 may include increasing the duty cycle of switch $So_3$ and/or turning switch Sc2 ON for a period of time. After increasing the regulated voltage, the controller may loop back to step 311.

If, at step 313, the controller determines that the regulated voltage is not below the first reference voltage, the controller may proceed to step 317 and compare the regulated voltage to a second reference voltage. If, at step 317 the controller determines that the regulated voltage is above the second reference voltage, the controller may proceed to step 319 and stop increasing the regulated voltage (in a case where increasing the regulated voltage may have commenced when step 315 was reached at an earlier iteration of method 310). For example, the controller may stop increasing the regulated voltage by maintaining a duty cycle of a switch connected to the regulated voltage terminal, or be deactivating a voltage compensation circuit (e.g., but turning switch Sc2 of FIG. 2B OFF).

It is to be noted that depending on controller architecture, the order of steps 313 and 317 may be reversed, or steps 313 and 317 may be parallelized (e.g., carried out in parallel in software or in hardware).

Figure 3C:
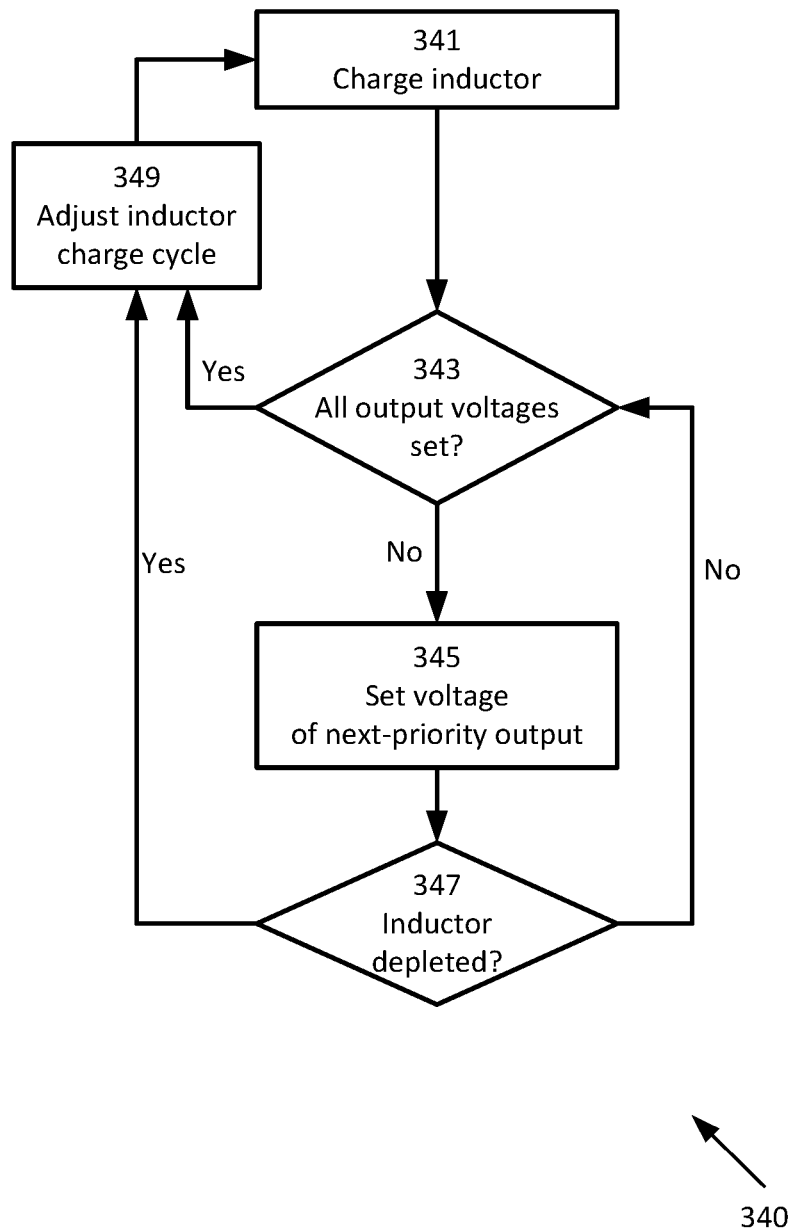
FIG. 3C illustrates a method for operating a SIMO converter according to one or more illustrative embodiments.

Reference is now made to FIG. 3C, which illustrates a method for controlling a group of regulated voltages, according to one or more features of the disclosure herein. Method 340 may be carried out by a controller such as controllers 210 of FIGS. 2A-2D, or controller 210e of FIG. 2E, and may be applied to converters 200a-200e. For simplicity, method 340 will be described with regard to converter 200a of FIG. 2A. At step 341, controller 210 may charge inductor L, for example, by turning switches $So_1$-$So_3$ OFF and turning switch Sgo ON. Controller 210 may remain at step 341 for a predefined period of time. The pre-defined period of time may correspond to a duty cycle determined at step 349 of a previous iteration of method 340. At step 343, controller 210 may evaluate or obtain measurements of regulated voltages (e.g. by receiving measurements from sensors/sensor interfaces 205a, the measurements corresponding to or being indicative of voltages Vo1-Vo3) and may determine whether or not the regulated voltages are set to the desired values. If the controller determines that the regulated voltages are set at desired values, the controller may proceed to step 349 and adjust the period of time for charging inductor L during the next charge cycle (step 341). For example, if inductor L is not required to discharge current to maintain the regulated voltage levels, it may be desirable to decrease the duration of the next charging period of time.

If, at step 343, if the controller determines that not all of the regulated voltages are at desired values, the controller may proceed to step 345 and select a regulated voltage terminal to compensate. According to some aspects of method 340, the selection may be according to a priority level. According to other aspects, the selection may be according to a different criterion (e.g. random selection, selection according by a predetermined order, etc.). The controller may set the voltage value at the selected voltage terminal (e.g., Vo3) to a desired value. The controller may set the voltage value, for example, by opening a first switch (e.g., Sgo), closing a second switch (e.g., $So_3$) and directing current to flow from inductor L through a corresponding capacitor (e.g., $Co_3$). When the voltage at the selected voltage terminal has reached a desired value, the controller may open the switch (e.g. $So_3$) and the corresponding capacitor may stop receiving current.

After step 345, the controller may continue to step 347 and evaluate the current flowing through inductor L (e.g., by receiving a measurement provided by sensors/sensor interfaces 206a or estimating the current based on measurements provided by sensors/sensor interfaces 206a). If the controller determines that the inductor L current is not sufficient to further charge additional capacitors to desired voltage levels, the controller may continue to step 349 and adjust a charging cycle period of time to allow inductor L to increase the inductor current for charging additional capacitors. For example, at step 349, the controller may increase the ON time of switch Sgo, to increase the period of time for charging inductor L during the next cycle.

If, at step 347, the controller determines that the inductor is still sufficiently charged with current to allow for compensating at least one additional output voltage, the controller may return to step 343 (discussed above).

Diodes shown according to various aspects of the disclosure may be replaced by transistors, and actively switched by a controller according to desired conduction times. Replacing diodes with transistors may provide certain advantages, such as bidirectional a reduction of associated conduction and switching losses and/or enabling a reverse current flowing from Y to X, which may lead to an increase in converter efficiency.

A "controller" as described herein may refer to a single digital or analog controller, and a controller may comprise one or more control circuits or devices operating in conjunction to implement control functionality.

According to one or more illustrative embodiments of the disclosure herein, the comparison between one or some of the output voltage measurements (e.g. output voltage Vo1-Vo3) to a reference value can be implemented in various ways, e.g. direct comparison, proportional comparison on the basis of predetermined values, etc.

Various converters disclosed herein have been shown to have one or more input terminals connected to power sources and one or more output terminals connectable to loads. Various permutations and arrangements may produce a converter having a single input and multiple outputs, multiple inputs and a single output, multiple inputs and multiple outputs, or a single input and a single output. A converter providing multiple outputs may be connected to a single load, and a converter providing multiple inputs may be connected to a single power source. All combinations and arrangements are included in the disclosure herein.

It is noted that various connections are set forth between elements herein. These connections are described in general and, unless specified otherwise, may be direct or indirect; this specification is not intended to be limiting in this respect. Further, elements of one embodiment may be combined with elements from other embodiments in appropriate combinations or sub combinations. For example, inductor L of FIGS. 2A-2D may be replaced by winding Wo having one or more floating output circuits 104 of FIG. 1D coupled via a winding Wf.

The invention claimed is:

1. A method comprising:
obtaining a first measurement of a first voltage at a first output terminal of a power converter, wherein the power converter comprises the first output terminal and a second output terminal, wherein the first output terminal is connected, via a first switch, to an input terminal, and wherein the second output terminal is connected, via a second switch, to the input terminal;
comparing the first voltage to a first reference voltage value;
based on the first voltage being less than the first reference voltage value, activating a voltage compensation circuit connected between the first output terminal and the second output terminal, wherein the voltage compensation circuit is configured to transfer charge from the second output terminal to the first output terminal; and
subsequent to the activating, deactivating the voltage compensation circuit.

2. The method of claim 1, wherein the deactivating is based on a second measuring of a second voltage at the first output terminal, wherein the second voltage is more than or substantially equal to a second reference value.

3. The method of claim 1, wherein the deactivating of the voltage compensation circuit is according to a time limit set by a clock after the activating.

4. The method of claim 1, wherein the activating adds additional voltage from charge stored in the second output terminal during the deactivating to a storage device coupled between the first output terminal and a first reference terminal.

5. The method of claim 1, wherein the activating comprising a closing a third switch.

6. The method of claim 5, wherein the voltage compensation circuit comprises a resistor connected in series with the third switch.

7. The method of claim 1, wherein the voltage compensation circuit is at least one of: a low-dropout regulator and a DC-DC power converter.

8. The method of claim 1, wherein the input terminal configured to receive power from one or more power sources.

9. The method of claim 1, wherein the first output terminal is configured to provide power to a load.

10. The method of claim 1, further comprising:
at least one inductive element connected between the input terminal and a second terminal connecting the first output terminal, and the second output terminal.

11. The method of claim 10, further comprising:
obtaining a second measurement of a third voltage at the second output terminal;
connecting, by a fourth switch, the at least one inductive element to a power source;
charging the at least one inductive element with current drawn from the power source;
based on the third voltage being less than a second reference voltage value, selecting the second output terminal;
based on a second determination that the current drawn by the at least one inductive element is equal or above a third reference value connecting the at least one inductive element to the second output terminal.

12. The method of claim 11, wherein the connecting the at least one inductive element to the second output terminal comprising: closing the second switch.

13. The method of claim 11, further comprising:
increasing the third voltage at the second output terminal by discharging the at least one inductive element and charging a second storage device at the second output terminal; and
disconnecting the second output terminal from the at least one inductive element.

14. The method of claim 13, wherein the second output terminal is disconnected from the at least one inductive element based on:
obtaining a first voltage measurement at the first output terminal; and
determining that the first voltage measurement is more than or equal to a fourth reference value.

15. The method of claim 13, wherein the second output terminal is disconnected from the at least one inductive element responsive to:
obtaining a measurement of the current in the at least one inductive element; and
determining that the measurement of the current in the at least one inductive element is less or equal to a fifth reference value.

16. The method of claim 1, wherein the deactivating is based on a second measuring of a second voltage at the first output terminal, wherein the second voltage is more than or substantially equal to a second reference value.

17. The method of claim 1, wherein the deactivating of the voltage compensation circuit is according to a time limit set by a clock after the activating.

18. The method of claim 1, wherein the activating adds additional voltage from charge stored in the second output terminal during the deactivating to a storage device coupled between the first output terminal and a first reference terminal.

19. The method of claim 1, wherein the activating comprising a closing a third switch.

20. A power converter comprising:
a voltage compensation circuit connected between a first output terminal of the power converter and a second output terminal of the power converter; and
a controller configured to:
obtain a first measurement of a first voltage at the first output terminal, wherein the first output terminal is connected, via a first switch, to an input terminal, and wherein the second output terminal is connected, via a second switch, to the input terminal;
compare the first voltage to a first reference voltage value;
based on the first voltage being less than the first reference voltage value, activate the voltage compensation circuit; and
subsequent to the activating, deactivate the voltage compensation circuit,
wherein when activated, the voltage compensation circuit is configured to transfer charge from the second output terminal to the first output terminal.

* * * * *